(12) United States Patent
Landberg

(10) Patent No.: US 10,900,503 B2
(45) Date of Patent: Jan. 26, 2021

(54) FLUID ACTUATOR ARRANGEMENT

(71) Applicant: SAAB AB, Linköping (SE)

(72) Inventor: Magnus Landberg, Linköping (SE)

(73) Assignee: SAAB AB, Linköping (SE)

( * ) Notice: Subject to any disclaimer, the term of this patent is extended or adjusted under 35 U.S.C. 154(b) by 260 days.

(21) Appl. No.: 16/071,327

(22) PCT Filed: Nov. 17, 2016

(86) PCT No.: PCT/SE2016/051137
§ 371 (c)(1),
(2) Date: Jul. 19, 2018

(87) PCT Pub. No.: WO2017/127003
PCT Pub. Date: Jul. 27, 2017

(65) Prior Publication Data
US 2019/0293093 A1 Sep. 26, 2019

(30) Foreign Application Priority Data

Jan. 21, 2016 (WO) .................. PCT/SE2016/050035

(51) Int. Cl.
*F15B 15/26* (2006.01)
*F15B 11/18* (2006.01)
(Continued)

(52) U.S. Cl.
CPC ............ *F15B 15/262* (2013.01); *B64C 13/40* (2013.01); *F15B 11/121* (2013.01);
(Continued)

(58) Field of Classification Search
CPC ......... F15B 11/18; F15B 11/183; F15B 11/22; F15B 15/1409; F15B 15/1447;
(Continued)

(56) References Cited

U.S. PATENT DOCUMENTS 3,733,971 A * 5/1973 Sugimoto ............. F15B 15/262
92/26
3,913,457 A * 10/1975 Hawley .................. F15B 11/18
92/13.3
(Continued)

FOREIGN PATENT DOCUMENTS

CN 1293325 A 5/2001
CN 1298475 A 6/2001
(Continued)

OTHER PUBLICATIONS

Chinese Office Action and Search Report in corresponding Chinese Application No. 201680079499.7 dated Nov. 4, 2109 (17 pages).
(Continued)

*Primary Examiner* — Michael Leslie
*Assistant Examiner* — Matthew Wiblin
(74) *Attorney, Agent, or Firm* — Jeffri A. Kaminski; Venable LLP

(57) ABSTRACT

A fluid actuator arrangement comprises a first cylinder housing including a first head member and a second head member; a first piston body is slidable arranged in said first cylinder housing; the first piston body divides the first cylinder housing interior into a first cylinder chamber and a second cylinder chamber, at least the first cylinder chamber is coupled to a fluid supply. The first piston body exhibits a first through-bore and a second through-bore that extend through the first piston body in an axial direction; a first piston rod is arranged slidable in the first through-bore and a second piston rod is arranged slidable in the second through-bore; and the first through-bore comprises a first engagement and disengagement device and the second through-bore comprises a second engagement and disengagement device, which are arranged for providing indi- (Continued)

vidual engagement or disengagement to or from the respective first and second piston rod.

23 Claims, 13 Drawing Sheets

(51) Int. Cl.
| | |
|---|---|
| F15B 15/14 | (2006.01) |
| F15B 11/12 | (2006.01) |
| B64C 13/40 | (2006.01) |
| B63B 21/08 | (2006.01) |
| B63B 21/00 | (2006.01) |
| B64C 3/38 | (2006.01) |
| B64C 3/44 | (2006.01) |

(52) U.S. Cl.
CPC .......... *F15B 11/127* (2013.01); *F15B 11/183* (2013.01); *F15B 15/148* (2013.01); *F15B 15/1466* (2013.01); *B63B 21/08* (2013.01); *B63B 2021/003* (2013.01); *B64C 3/38* (2013.01); *B64C 2003/445* (2013.01); *F15B 2015/268* (2013.01); *F15B 2211/7054* (2013.01); *F15B 2211/71* (2013.01); *F15B 2211/715* (2013.01)

(58) Field of Classification Search
CPC .. F15B 15/1466; F15B 15/262; F15B 15/265; F15B 15/28; F15B 15/2838
See application file for complete search history.

(56) References Cited

U.S. PATENT DOCUMENTS

| | | | | | |
|---|---|---|---|---|---|
| 4,526,086 | A | * | 7/1985 | Holton | F15B 11/18 91/43 |
| 4,689,553 | A | * | 8/1987 | Haddox | F15B 15/28 324/635 |
| 4,817,783 | A | * | 4/1989 | Foster | B65G 25/065 198/750.5 |
| 4,915,281 | A | * | 4/1990 | Berger | B66D 3/006 198/468.2 |
| 5,353,687 | A | | 10/1994 | Koenig | |
| 5,651,302 | A | * | 7/1997 | Mills | F04B 1/00 417/460 |
| 6,345,568 | B1 | | 2/2002 | Wakasugi et al. | |
| 6,497,173 | B1 | * | 12/2002 | Dalland | F15B 15/1409 92/146 |
| 7,108,108 | B1 | * | 9/2006 | Heinzeroth | B23B 31/305 188/170 |
| 9,995,320 | B2 | * | 6/2018 | Landberg | F15B 15/02 |
| 2002/0134230 | A1 | | 9/2002 | Hirling | |
| 2004/0177612 | A1 | * | 9/2004 | Geiger | F15B 15/262 60/545 |
| 2013/0277584 | A1 | * | 10/2013 | McKernan | F15B 11/22 251/129.01 |
| 2019/0337149 | A1 | * | 11/2019 | Landberg | B25J 9/1065 |

FOREIGN PATENT DOCUMENTS

| | | |
|---|---|---|
| CN | 1473698 A | 2/2004 |
| CN | 103017649 A | 4/2013 |
| CN | 203347711 U | 12/2013 |
| DE | 2649958 A1 | 5/1978 |
| EP | 0067719 A1 | 12/1982 |
| JP | S5680513 A | 7/1981 |
| JP | 3-125004 A | 5/1991 |
| WO | 2012152253 A1 | 11/2012 |
| WO | 2015195029 A1 | 12/2015 |

OTHER PUBLICATIONS

International Search Report dated Jan. 27, 2017 in corresponding International Application No. PCT/SE2016/051137 (5 pages).
Written Opinion dated Jan. 27, 2017 in corresponding international application No. PCT/SE2016/051137 (5 pages).

* cited by examiner

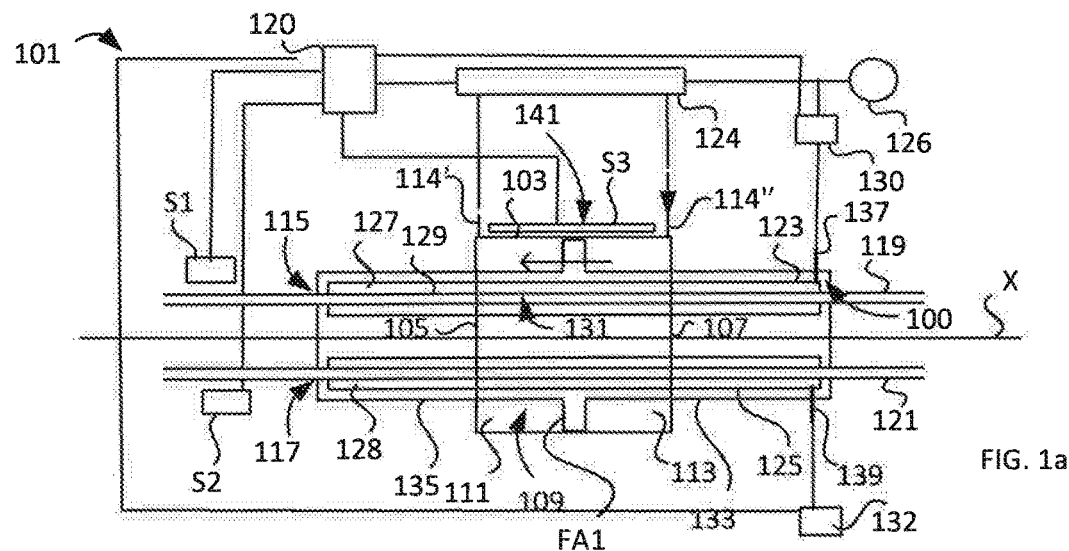
FIG. 1a
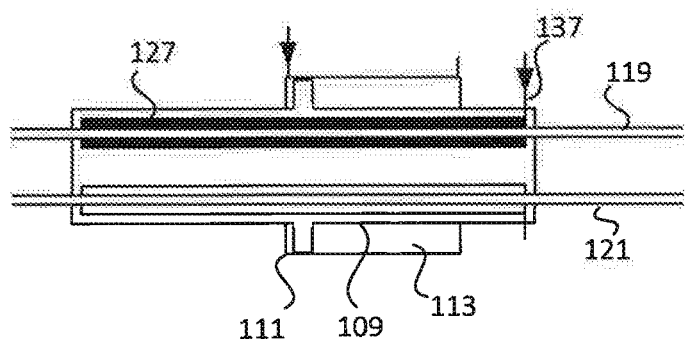
FIG. 1b
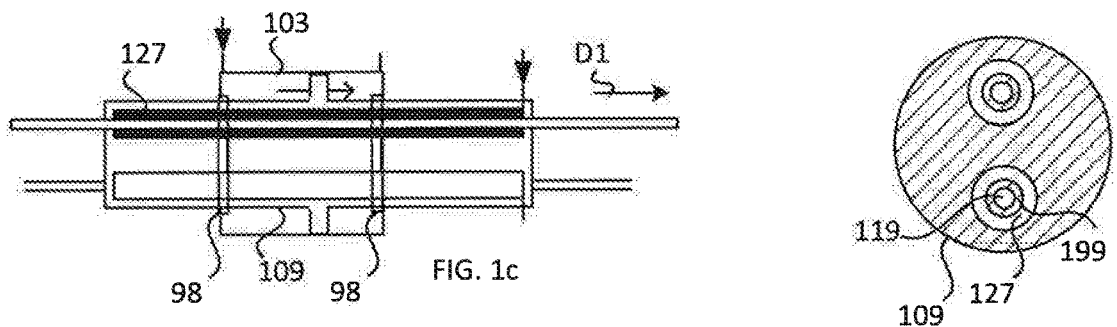
FIG. 1c
FIG. 1e
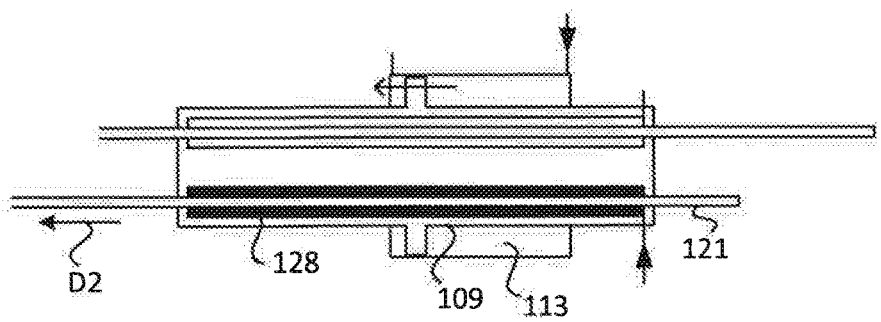
FIG. 1d

A-A

CPFS

| P1 | | | | P2 | | | | S1-P1 | S2-P2 | $\sum$ | | | |
|---|---|---|---|---|---|---|---|---|---|---|---|---|---|
| a1 | b1 | c1 | d1 | a2 | b2 | c2 | d2 | △ | △ | a | b | c | d |
| - | - | - | - | - | X | - | - | 0 | -12 | 0 | -12 | 0 | 0 |
| - | X | - | - | - | - | X | - | +7 | +10 | 0 | -5 | +10 | 0 |
| - | X | - | X | - | - | - | - | -15 | +12 | 0 | -20 | +10 | -15 |
| - | - | X | - | - | - | - | - | +6 | 0 | 0 | -20 | +16 | -15 |
| - | - | - | - | X | X | X | X | +2 | -6 | -6 | -26 | +10 | -21 |
| - | X | - | - | - | - | - | - | -20 | -4 | -6 | -46 | +10 | -21 |
| - | - | - | - | - | - | - | - | 0 | 0 | -6 | -46 | +10 | -21 |
| 0 | -28 | +6 | -15 | | | | | | | | | | |
| | | | | -6 | -18 | +4 | -6 | | | | | | |

FLUID ACTUATOR ARRANGEMENT

CROSS-REFERENCE TO RELATED APPLICATIONS

This application is a U.S. National Stage application of PCT/SE2016/051137, filed Nov. 17, 2016 and published on Jul. 27, 2017 as WO/2017/127003, which claims the benefit of an International Application of PCT/SE2016/050035, filed Jan. 21, 2016, the contents of which are hereby incorporated by reference in their entireties.

TECHNICAL FIELD

The present invention relates to a fluid actuator arrangement according to the preamble of claim 1. The present invention also relates to a method for operating the fluid actuator arrangement. The present invention may concern the industry using hydraulic and/or pneumatic actuators for different types of applications and may also concern the manufacture industry producing multi piston rod actuator arrangements.

The present invention may be put into use in humanoid robots, robot hands, all-terrain robots, so called morphing wings in flight, motion compensators, robotic fishes, multi elevator apparatuses, robotic arms with many leads in surgery applications, materials handling devices (so called piggy-back cylinders) etc.

BACKGROUND

Current fluid actuator arrangements having a cylinder housing with at least two piston rods are dependent on large cylinder chamber volumes for providing long strokes.

WO 2012/152253 discloses a fluid actuator arrangement having a plurality of piston rods, each actuated in dependency to the motion of an opposite piston rod.

SUMMARY OF THE INVENTION

There is an object to provide a compact and lightweight (e.g. multi piston rod actuator) and cost-effective fluid actuator arrangement of the type defined in the introduction.

There is an object to provide a fluid actuator arrangement that can perform high forces and precise movements combined with quick movements.

There is also an object to provide a compact fluid actuator arrangement that can produce energy-efficient drives for multiple linear movements.

There is an object to, in some applications, replace electrical actuators with said fluid actuator arrangements, as they when holding a piston rod in the same position for a long time will become detrimental warm and will consume a lot of electricity.

There is an object to reach more efficient control of speed and force of a fluid actuator arrangement.

Yet another object is to reduce power output of the fluid supply coupled to the fluid actuator arrangement.

There is also an object to reduce energy losses.

A yet further object is to improve current multi piston rod actuator arrangements in various industrial applications.

An object is to provide a fluid actuator arrangement that accomplish work with only a small amount of input force.

There is an object to design a less bulky reservoir tank of a fluid actuator arrangement.

There is an object to achieve power efficient fluid actuator arrangement.

This or at least one of said objects has been achieved by a fluid actuator arrangement comprising a first cylinder housing including a first head member and a second head member; a first piston body is slidable arranged in said first cylinder housing; the first piston body divides the first cylinder housing interior into a first cylinder chamber and a second cylinder chamber, at least the first cylinder chamber is coupled to a fluid supply; the first piston body exhibits a first through-bore and a second through-bore that extend through the first piston body in an axial direction; a first piston rod is arranged slidable in the first through-bore and a second piston rod is arranged slidable in the second through-bore; and the first through-bore comprises a first engagement and disengagement device and the second through-bore comprises a second engagement and disengagement device, each of the first engagement and disengagement device and the second engagement and disengagement device being arranged for providing individual engagement or disengagement to or from the respective first and second piston rod.

Thereby is achieved that a very small and less bulky fluid reservoir of the fluid supply is needed as the fluid actuator a arrangement does not require any specific volume variations as being the case with current multi-rod actuators.

Thereby is achieved compact, lightweight and cost-effective multiple servo drives, especially if high hydraulic pressure is being used.

Thereby is achieved a compact fluid actuator arrangement that efficiently generates and distributes mechanical linear movement.

Thereby is achieved a compact fluid actuator arrangement that is suitable for tensile loads, because thick bars for compressive loads make prior art arrangement bulky.

Thereby is achieved a pulsated propulsion of the piston rods by means of a minor number of components providing a cost-effective and space saving arrangement.

Thereby is achieved that the arrangement can be used in applications where no continuous movement is needed, e.g. secondary actuation in an aircraft.

Preferably, the first engagement and disengagement device is arranged in the first piston body for providing an individual alternately (e.g. momentary) clamping action on the first piston rod.

Suitably, the second engagement and disengagement device is arranged in the first piston body for providing an individual alternately (e.g. momentary) clamping action on the second piston rod.

Preferably, at least three piston rods are arranged to be individually moved by the common first piston body.

Thereby is achieved an arrangement that can use an optimized system pressure level corresponding to actual total load.

Thereby is achieved that simultaneous rod movements can be achieved in both directions, which will provide for a multi-use application and implies high efficiency.

Thereby is achieved that the risk for overheating the fluid actuator arrangement is minimized as the generated heat energy is taken away by the flowing oil even though the arrangement comprises multiple rods.

Thereby is achieved that a high number of piston rods with different diameter, stroke and load demand can be controlled by a common piston.

Suitably, the fluid actuator arrangement comprises an activating device associated with the respective first and second engagement and disengagement device for individually providing said engagement or disengagement.

Preferably, the axial direction corresponds with the prolongation of the respective first and second piston rod.

Suitably, the respective piston rod extends through at least a first and a second piston body.

Preferably, the axial direction corresponds with the motion direction of the respective piston rod.

Suitably, the axial direction corresponds with the prolongation of the first piston body.

Preferably, the first through-bore comprises a first clamping section comprising the first engagement and disengagement device and the second through-bore the second clamping section comprising the second engagement and disengagement device, each engagement and disengagement device is arranged for providing an individually engagement or disengagement to or from the respective first piston rod and the second piston rod.

Suitably, the fluid actuator arrangement comprises an activating device associated with the respective first and second engagement and disengagement device for individually providing said engagement or disengagement.

The activating device may comprise an electro-magnetic piston rod engagement and disengagement device or a fluid controlled piston rod engagement and disengagement device.

Preferably, the activating device is coupled to a control unit.

Thereby is achieved that the respective piston rod can be individually coupled to the piston body for individually controlled motion.

Suitably, the fluid actuator arrangement comprises a valve arrangement coupled to the respective first and second engagement and disengagement device and to the fluid supply.

Thereby is achieved that the valve arrangement is coupled to the fluid supply and to a control unit for providing controlling of the activating device and in turn providing a control of the respective first and second engagement and disengagement device independently of each other.

Preferably, the first engagement and disengagement device comprises a first hollow space coupled to the fluid supply, whereby a first flexible clamping wall of the first piston body is defined between the first hollow space and a first inner camping surface of the first piston body.

Thereby is achieved an engagement and disengagement device having a minor number of movable components for providing individual engagement or disengagement of the piston body to/from the piston rod in an efficient way.

Preferably, the first inner clamping surface of the first piston body is designed to provide a clamping action on any portion of the envelope surface of the first piston rod upon pressurization of the first hollow space.

Suitably, the pressurization of the first hollow space expands the first flexible clamping wall in a direction radially inward.

Preferably, the first piston body comprises a first extending sleeve portion that extends in the axial direction from the first cylinder housing interior through at least the first head member.

Thereby is achieved that the first hollow space of the first engagement and disengagement device can be connected directly to a fluid supply via the first piston body.

Preferably, the first extending sleeve portion extends from a first main portion of the first piston body, which first main portion forms at least a first piston force area within the first cylinder housing.

Suitably, the first extending sleeve portion exhibits a smaller diameter than a first main portion of the first piston body forming a piston force area within the first cylinder housing.

Preferably, a second extending sleeve portion of a second piston body exhibits a smaller diameter than a second main portion of the second piston body forming a piston force area within the second cylinder housing.

Thereby is achieved that the piston body can be designed with a large clamping surface of each engagement and disengagement device for providing a proper clamping action onto the envelope surface of the respective piston rod by determining proper ratio between the diameter of the first extending sleeve portion and the first main portion encompassed within the first cylinder housing.

Preferably, the first piston body is designed as a cylindrical block having an intermediate portion (defining the first main portion), and extending therefrom in the axial direction, the first extending sleeve portion and in the opposite direction a second extending sleeve portion.

Suitably, the diameter of the first extending sleeve portion and of the second extending sleeve portion is smaller than that of the intermediate portion.

Preferably, the diameter of the first extending sleeve portion corresponds with the diameter of the second extending sleeve portion.

Suitably, the diameter of the first extending sleeve portion is smaller than the diameter of the second extending sleeve portion.

Suitably, the first and second piston force area exhibit an extension transverse to the axial direction.

Preferably, the first engagement and disengagement device is coupled to a control valve, wherein a control unit is adapted to control said control valve.

Thereby is achieved that the respective piston rod can be controlled individually to make a specific motion.

Suitably, the first cylinder chamber and the second cylinder chamber is each being coupled to the fluid supply via a valve member for controlling a reciprocating motion of the first piston body.

Thereby is achieved that the respective piston rod can be moved under load in both directions along the axial direction.

Preferably, the fluid supply is coupled to the first engagement and disengagement device via a first fluid channel of a first extending sleeve portion of the first piston body, the first extending sleeve portion extending from the first cylinder housing in the axial direction.

Suitably, the fluid supply is coupled to the second engagement and disengagement device via a second fluid channel of the first extending sleeve portion of the first piston body extending from the first cylinder housing in the axial direction.

Preferably, the at least first and second fluid channel each merges into a common position or at least into one common hose.

Thereby is achieved that the arrangement can be made reliable and having a simple and space saving coupling between the respective engagement and disengagement device and the fluid supply.

Suitably, the number of piston rods that extend through the first piston body is three or more.

Thereby is achieved that the fluid actuator arrangement can make use of a number of piston bodies adapted in corresponding cylinders for different speed in series, whereby the speed of the individual rod can be selected.

Thereby is achieved a fluid actuator arrangement that is compact and of low weight and at the same time manages to control three or more piston rods.

Thereby is achieved that the arrangement can be used in an aircraft that changes its external shape during flight.

Thereby is achieved that simultaneous rod movements can be performed in both directions implying high efficiency.

Preferably, the first piston rod exhibits larger diameter than the diameter of the second piston rod.

Thereby is achieved that the piston rod with larger diameter can be used for pushing a load and the piston rod with smaller diameter can be used for pulling a load.

Suitably, a first sensor member is associated with the first piston rod.

Preferably, a second sensor member is arranged to the first cylinder housing.

Suitably, a third sensor member is coupled to a hollow space of the engagement and disengagement device.

Preferably, at least the first, second and third sensor member comprises a position sensor, linear motion sensor, and/or a pressure sensor etc.

Thereby is achieved that the individual load or pressure demand of each piston rod can be summarized in an algorithm for the actual pressure that is required.

Thereby is achieved an efficient way of load sensing in the fluid actuator arrangement.

Suitably, the sensor member (first and/or second and/or third) is coupled to a control unit adapted to control the motion of the first and second piston bodies and to control the engagement and disengagement of the first and second piston bodies to the respective first and second piston rod.

Thereby is achieved that that the motion of the respective piston rod can be controlled in regard to an actual performance or motion value.

Preferably, a fixed main rod is fixed to a global coordinate system, the fixed main rod constitutes the first piston rod and at least one second piston rod is locally movable relative the first piston rod.

Thereby the arrangement can be used for different jig installations.

Suitably, the arrangement further comprises; a second cylinder housing including a first head member and a second head member; a second piston body slidable arranged in said second cylinder housing; the second piston body divides the second cylinder housing interior into a first cylinder chamber and a second cylinder chamber, at least the first cylinder chamber is coupled to a fluid supply: the second piston body exhibits a first through-bore and a second through-bore that extend through the second piston body in an axial direction; the first piston rod is arranged slidable in the first through-bore and the second piston rod is arranged slidable in the second through-bore; and the first through-bore comprises a first engagement and disengagement device and the second through-bore comprises a second engagement and disengagement device for providing an individually engagement or disengagement of the second piston body to or from respective piston rod.

Thereby is achieved at least two full time opposite working pistons. By the separate pressurization of each engagement and disengagement device (clamping element), there is achieved fast clamping and by straight forward valve switching, there are provided simultaneous rod movements in both directions.

Thereby is achieved a fluid actuator arrangement that can provide fast movements and also compact applications.

Thereby is achieved continuous individual motion of a piston rod by alternately activating the respective first and second piston body.

By the use of at least two piston bodies, each comprising at least two engagement and disengagement devices, there is achieved that a small amount of fluid can be utilized for driving the piston rod a long distance. Current prior art long cylinders use a large volume and large amount of fluid for driving a piston rod a long distance. The small amount of fluid used in the first and second cylinder chambers implies a high stiffness in operation.

Preferably, a bearing member is arranged between the first cylinder housing and the first piston body.

In such way is achieved that side loads generated on the first piston body due to asymmetric used piston rods relatively the piston body.

Suitably, the bearing member comprises bronze or comprises bronze alloy and/or tin bronze and/or lead free bronze and/or copper and/or aluminium-bronze and/or carbon graphite or other low friction material.

This or at least one of said objects has been achieved by a method for controlling the motion of a first piston rod and a second piston rod by means of a first piston body slidable arranged in a first cylinder housing of a fluid actuator arrangement, the first piston body divides the first cylinder housing interior into a first cylinder chamber and a second cylinder chamber, the first piston body exhibits a first through-bore and a second through-bore each encompassing the first piston rod and the second piston rod respectively, the first piston body comprises a first and second engagement and disengagement device arranged for engagement with the respective first and second piston rod; the method comprises the steps of; pressurizing the first and second cylinder chamber providing alternately a first and second stroke for achieving a reciprocating motion of the first piston body; engaging the first piston body to the first piston rod in the first stroke; engaging the first piston body to the second piston rod in the second stroke.

Thereby is achieved that an individual piston rod, of a set of at least two piston rods, can be controlled individually and can be driven an optional distance independently of the stroke length of the cylinder housing, without any need of arranging a cylinder housing and piston for each piston rod.

Preferably, the method further comprises the step of disengaging the first piston body from the first piston rod and the second piston rod.

Suitably, high hydraulic pressure is generated by the fluid supply for pressurizing the cylinder chambers.

Thereby is achieved a compact, lightweight, stiff, and cost-effective multiple servo drives.

Suitably, low hydraulic pressure is generated by the fluid supply for pressurizing the cylinder chambers.

Preferably, the fluid actuator arrangement further comprises a second piston body slidable arranged in a second cylinder housing and dividing the second cylinder housing interior into a first cylinder chamber and a second cylinder chamber, the second piston body exhibits a first through-bore and a second through-bore encompassing the first piston rod and the second piston rod, the second piston body comprises a first and second engagement and disengagement device arranged for engagement with the respective first and second piston rod; the method comprises the steps of; pressurizing the first and second cylinder chamber of the first cylinder housing providing alternately a first and second stroke for achieving a first reciprocating motion of the first piston body; pressurizing the first and second cylinder chamber of the second cylinder housing providing alternately a first and second stroke for achieving a second reciprocating motion of the second piston body, the first reciprocating motion being reversed relative the second reciprocating motion; engaging the first piston body to the first piston rod in the first stroke and disengaging the second piston body from the first piston rod; engaging the second piston body to the second piston rod in the first stroke and disengaging the first piston body from the second piston rod; engaging the first piston body to the second piston rod in the second stroke and disengaging the first piston body from the first piston rod; and engaging the second piston body to the first piston rod in the second stroke and disengaging the second piston body from the second piston rod.

Suitably, the fluid actuator arrangement further comprises a first static clamping unit activated for clamping on the first piston rod by pressurizing an interior expandable cavity of the first static clamping unit by means of said fluid supply or other fluid supply, the method comprises the step of; engaging the first static clamping unit to the first piston rod, whereby at least the first piston body is disengaged from the first piston rod.

Thereby is achieved that high forces and precise movements of the piston rods are provided by the fluid actuator arrangement.

Thereby is achieved that also quick movements of the piston rods.

Thereby is achieved that a large load of one or more than two piston rods can be kept for a long time in one position during operation of the fluid actuator arrangement.

Thereby is achieved that the propulsion of the respective piston rod can be combined with static locking of one or at least two piston rods.

Thereby is achieved that a static friction joint is provided, whereas when combined with two dynamic piston bodies (each arranged in the respective cylinder housing) there is possible to perform a linear axis movement with high speed at low load combined with the provision of a high load to the static friction joint for a long time period without generating any heat.

Thereby is achieved that the fluid actuator arrangement can be configured with at least two fast moving pistons with low clamping force and with the first static clamping unit with high clamping force.

Preferably, the fluid actuator arrangement further comprises a third piston body slidable arranged in a third cylinder housing and dividing the third cylinder housing interior into a first cylinder chamber and a second cylinder chamber, the third piston body exhibits a first through-bore and a second through-bore encompassing the first piston rod and the second piston rod, the third piston body comprises a first and second engagement and disengagement device arranged for engagement with the respective first and second piston rod; the method comprises the steps of; alternately pressurizing the first and second cylinder chamber of the third cylinder housing providing alternately a first and second stroke for achieving a third reciprocating motion of the third piston body, the first stroke of the third reciprocating motion overlaps the first stroke starting point of the first piston body.

Suitably, the method comprises the step of alternately pressurizing the first and second cylinder chamber of the third cylinder housing implies a continuous movement of the individual piston rod.

Thereby is achieved a non-pulsated motion of the piston rod.

Preferably, the method comprises the step of controlling pairs of piston bodies, one having different speed than the other.

Thereby is achieved that different speed of linear movement can be provided.

Preferably, Pulse Wide Modulation (PWM) technology is applied to the fluid actuator arrangement for controlling the speed of the piston rod motion.

Suitably, a first and a second piston body work in anti-phase.

Thereby is achieved that eventual vibrations are eliminated when the piston bodies change direction.

Preferably, the fluid supply (e.g. constituting a high pressure fluid supply) generates a system pressure and a pressurized fluid, whereby a higher pressure of the fluid is achieved in the hollow space of the engagement and disengagement device and a lower pressure of the fluid is achieved in the pressurized cylinder chamber corresponding to the system pressure of the fluid supply.

Thereby is achieved that the measure of the engagement area of the engagement and disengagement device defined between the piston body and the actuated (engaged) piston rod can be made relatively small in relation to the piston force area of the piston body.

Thereby the engagement and disengagement devices can be positioned mirror-inverted, i.e. alternately arranged facing away from each other in the piston body.

Thereby, the fluid actuator arrangement can be made more compact as a larger number of piston rods can extend through the piston body.

Suitably, the higher pressure of the fluid in the hollow space is 10-80 Mpa, preferably 30-60 Mpa or about 45 Mpa for reaching a friction joint between the respective piston rod and the piston body.

Preferably, the control unit is adapted to execute "time sharing" between piston rod motions, i.e. one piston rod is moved one at the time (the other piston rods are momentary in static position) so that the common piston force area can be held as small as possible and the force requirement of the single piston rod depicts the common piston area.

Thereby the fluid actuator arrangement can be made even more compact and lightweight.

Thereby also the fluid supply can be designed with lower power requirements.

In such way is achieved that a specific number of pistons of the fluid actuator arrangement can be driven with different speed in series and also the speed of the individual rod can be selected.

Preferably, several piston rods are at least individually controlled by the same piston body.

Suitably, a common piston body performs simultaneous movement to at least two piston rods.

Preferably, each piston rod is individually coupled (engaged) to the piston body by means of an individual clamping element (engagement and disengagement device) of the piston body and controlled by an individual logic valve coupled to the clamping element.

The definition of cap end may be interpreted as a base plate, cylinder cap end comprising at least two through-bores each arranged for a respective piston rod.

The definition of a hollow space may be interpreted as a cavity, slit, gap, chamber or other suitable wording.

Preferably, the hollow space is defined as an expandable hollow space.

Suitably, the hollow space may comprise one flexible space or at least two flexible spaces.

Suitably, the first hollow space or hollow spaces of the first engagement and disengagement device of the first piston body being placed in such positions that upon pressurizing the first hollow space/hollow spaces there is produced a clamping force (forces) (in radial direction inwardly and e.g. evenly distributed around the circular cross-section of the first piston rod) toward the adjacent envelope surface of the first piston rod. The clamping force is produced by means of a first flexible clamping wall of the first engagement and disengagement device, which first flexible clamping wall expands inwardly when pressurizing the hollow space/hollow spaces. The first flexible clamping wall is positioned between the first hollow space/hollow spaces and the first piston rod envelope surface.

Preferably, the first hollow space and/or hollow spaces of the first engagement and disengagement device is/are evenly positioned circumferentially around the first flexible clamping wall.

Suitably, the first hollow space or hollow spaces being coupled for fluid communication with the fluid supply via a first valve arrangement.

Preferably, the second hollow space or hollow spaces of the second engagement and disengagement device of the first piston body being placed in such positions that upon pressurizing the second hollow space/hollow spaces there is produced a clamping force (forces) (in radial direction inwardly and e.g. evenly distributed around the circular cross-section of the second piston rod) toward the adjacent envelope surface of the second piston rod. The clamping force is produced by means of a second flexible clamping wall of the second engagement and disengagement device, which first flexible clamping wall expands inwardly when pressurizing the second hollow space/hollow spaces. The second flexible clamping wall is positioned between the second hollow space/hollow spaces and the second piston rod envelope surface.

Preferably, the second hollow space and/or hollow spaces of the second engagement and disengagement device is/are evenly positioned circumferentially around the second flexible clamping wall.

Suitably, the second hollow space or hollow spaces being coupled for fluid communication with the fluid supply via a second valve arrangement.

Preferably, the fluid actuator arrangement comprises a second piston body comprising a first and second engagement and disengagement device as defined above.

Suitably, the fluid actuator arrangement comprises a third and/or fourth engagement and disengagement device, each of which comprising the features as defined above belonging to the first and second engagement and disengagement devices.

Alternately, a sensor member is associated with the piston rods for measuring the position of the first (second, third, fourth etc.) piston rod in such way that the sensor member measures the position of the first piston body relative the first cylinder housing.

Preferably, a sensor member is associated with the first and second piston rod for measuring the position of the first (second, third, fourth etc.) piston rod in such way that the sensor member measures the position of the second piston body relative the second cylinder housing.

Suitably, the sensor member is coupled to a control unit adapted to register the actual position of the respective piston rod.

Preferably, the control unit is adapted to calculate the actual position of the respective piston rod by taking into account previously performed and registred position of the first and/or second piston body.

Suitably, the control unit is adapted to store the registred position in a memory unit.

Preferably, the control unit is adapted to calculate the actual position of the first and second piston rod by means of adding previously stored registred position to a new registred actual position.

Suitably, a sensor device is adapted to measure the actual position of the respective first and second piston rod.

Preferably, the sensor device is coupled to the control unit.

Suitably, the fluid actuator arrangement comprises a sensor device coupled to the control unit adapted to control the motion of the first piston rod according to a feedback loop and adapted to compare a desired position value with an actual position value of the position of first piston rod relative the first cylinder housing.

Suitably, the control unit is adapted to register data regarding the actual engagement and disengagement of the respective first (second, third, fourth etc.) engagement and disengagement device and to register data regarding the actual position of the respective first and/or second piston body.

Preferably, the control unit is adapted to calculate the actual position of the first (second, third, fourth etc.) piston rod by taking into account the registred data regarding the actual engagement and disengagement of the respective first (second, third, fourth etc.) engagement and disengagement device and by taking into account the registred data regarding the actual position of the respective first and/or second piston body.

Preferably, the sensor member is mounted in the first and second cylinder chamber or exterior the first and/or second cylinder housing.

Preferably, the sensor member detects the position of the first and/or second piston body in a linear motion and converts the motion into output signals, which are suitable for processing, transmission or control depending on the application and which are fed to the control unit.

Preferably, the sensor member reads the position of the first and/or second piston body in order to convert the encoded position into an analog and/or digital signal, which signal is decoded into the actual position of the first and/or second piston body by a digital readout and/or a motion controller. The position of the first and/or second piston body can be determined by change in position of the first and/or second piston body over time.

Suitably, the linear encoder sensor may comprise optical, magnetic, inductive, capacitive and eddy current means.

This is solved by a data medium storing program adapted for controlling the motion of a first piston rod and a second piston rod by means of a first piston body slidable arranged in a first cylinder housing of a fluid actuator arrangement, the first piston body divides the first cylinder housing interior into a first cylinder chamber and a second cylinder chamber, the first piston body exhibits a first through-bore and a second through-bore each encompassing the first piston rod and the second piston rod respectively, the first piston body comprises a first and second engagement and disengagement device arranged for engagement with the respective first and second piston rod, wherein said data medium storing program comprises a program code stored on a medium, which is readable on a computer, for causing a control unit to perform the method steps of: pressurizing the first and second cylinder chamber providing alternately a first and second stroke for achieving a reciprocating motion of the first piston body; engaging the first piston body to the first piston rod in the first stroke; and engaging the first piston body to the second piston rod in the second stroke.

This is solved by a data medium storing program product comprising a program code stored on a medium, which is readable on a computer, for performing the method steps according to claims 15 to 19, when a data medium storing program according to claim 21 is run on the control unit.

Preferably, the value of every new position of the first piston body relative the first cylinder housing being measured by the sensor member is stored in a memory unit of the control unit and by means of the control unit.

Suitably, the value of every new position is related to a reference value.

Preferably, the reference value is a well-defined and known position of the first piston body relative the first cylinder housing.

Suitably, the well-defined and known position corresponds with a position of the first piston rod relative the first cylinder housing wherein the first piston rod is moved to an end position relative the first cylinder housing.

BRIEF DESCRIPTION OF THE DRAWINGS

The present invention will now be described by way of examples with references to the accompanying schematic drawings, of which:

FIGS. 1a-1d illustrate a fluid actuator arrangement according to a first example;

FIGS. 1e-1g illustrate further examples of clamping arrangements;

FIG. 7b illustrates the fluid actuator arrangement comprising the piston body in FIG. 7a;

DETAILED DESCRIPTION

Figure 2:
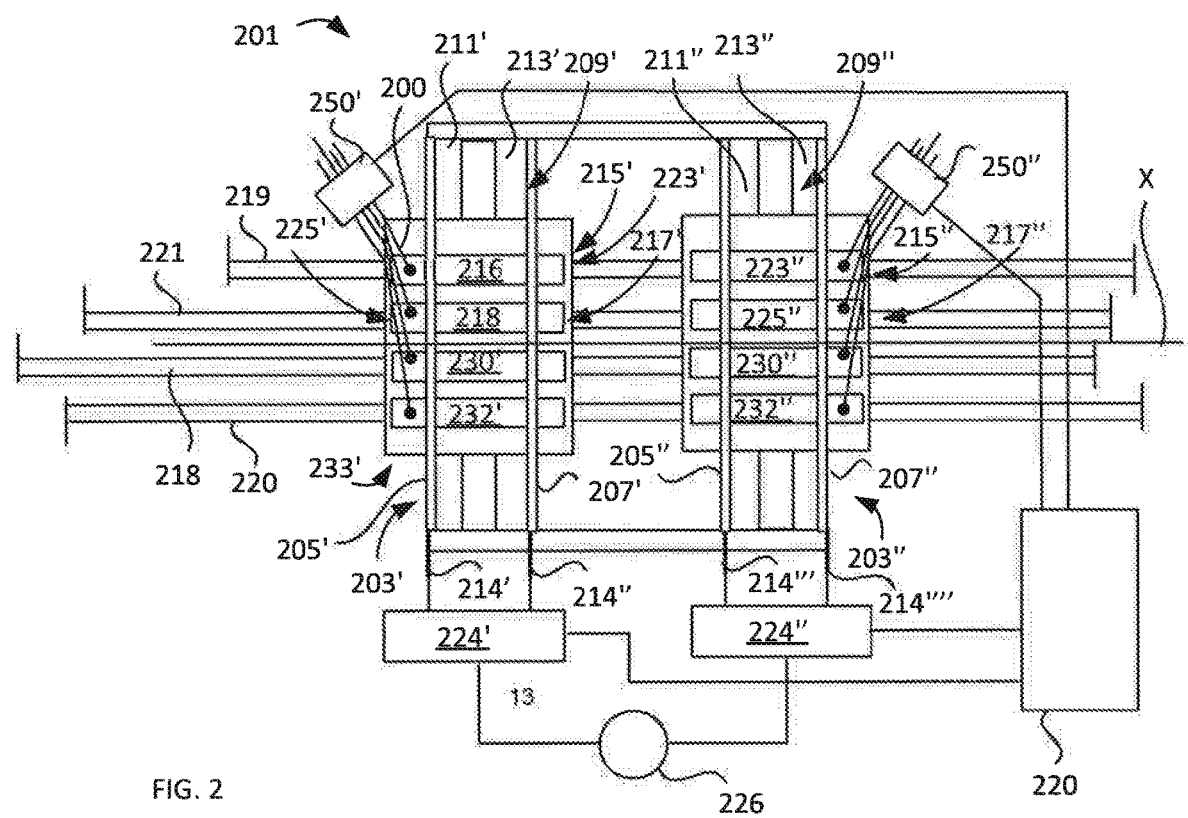
FIG. 2 illustrates a fluid actuator arrangement according to a second example.

Hereinafter, exemplary embodiments of the present invention will be described with reference to the accompanying drawings, wherein for the sake of clarity and understanding of the invention some details of no importance may be deleted from the drawings.

FIGS. 1a-1d show a first exemplary embodiment of a fluid actuator arrangement 101. In FIG. 1a is shown the fluid actuator arrangement 101 comprising a cylinder housing 103 including a first head member 105 and a second head member 107. A piston body 109 is slidable arranged in the cylinder housing 103. The piston body 109 divides the cylinder housing 103 interior into a first cylinder chamber 111 and a second cylinder chamber 113. The first cylinder chamber 111 and the second cylinder chamber 113 are coupled to a fluid supply 126 via fluid ports 114', 114". The piston body 109 exhibits a first through-bore 115 and a second through-bore 117. The first through-bore 115 and the second through-bore 117 each extends through the piston body 109 parallel with an axial direction X extending along the piston body 109 and in separated positions and parallel with each other. A first piston rod 119 is arranged slidable in the first through-bore 115. A second piston rod 121 is arranged slidable in the second through-bore 117. The first through-bore 115 comprises a first clamping section 116 comprising a first engagement and disengagement device 123. The second through-bore 117 comprises a second clamping section 118 comprising a second engagement and disengagement device 125. The respective first engagement and disengagement device 123 and second engagement and disengagement device 125 each provides an individually engagement or disengagement to or from the respective first piston rod 119 and the second piston rod 121. The fluid actuator arrangement 101 comprises a valve arrangement 124 (e.g. comprising one singe or more than two valves) coupled to the respective first 123 and second 125 engagement and disengagement device. The valve arrangement 124 is also coupled to the fluid supply 126. By means of a control unit 120 coupled to the valve arrangement 124 there is provided that the valve arrangement 124 can be controlled to control the respective first 123 and second 125 engagement and disengagement device in an individually manner for a clamping action and/or a release action respectively. In such way the respective first engagement and disengagement device 123 and the second engagement and disengagement device 125 can be individually engaged with and disengaged from the respective first 119 and second 121 piston rod. The first engagement and disengagement device 123 comprises a first hollow space 127 coupled to the fluid supply. A first flexible clamping wall 129 of the piston body 109 is defined between the first hollow space 127 and a first inner camping surface 131 of the piston body 109. The first inner clamping surface 131 of the piston body 109 is designed to provide a clamping action on any portion of the envelope surface of the first piston rod 119 upon pressurization of the first hollow space 127. The pressurization of the first hollow space 127 is controlled by the control unit 120. The pressurization of the first hollow space 127 is controlled by the control unit 120 expands the first flexible clamping wall 129 in a direction radially inwardly. The piston body 109 comprises a first extending sleeve portion 133 that extends in the axial direction X (parallel with the extension of the first and second piston rod respectively) from the cylinder housing 103 interior through the first head member 105. The piston body 109 comprises a second extending sleeve portion 135 that extends in the axial direction X from the cylinder housing 103 interior through the second head member 107. The first hollow space 127 of the first engagement and disengagement device 123 is coupled to the fluid supply 126 via the first extending sleeve portion 133 of the piston body 109 by means of a first fluid coupling 137. A first logic valve 130 is coupled to the first fluid coupling 137 and to the fluid supply 126. A first fluid channel 100 extends between the first engagement and disengagement device 123 and the first logic valve 130. The control unit 120 is coupled to the first logic valve 130 for controlling the engagement and disengagement between the piston body 109 and the first piston rod 119. A second hollow space 128 of the second engagement and disengagement device 125 is coupled to the fluid supply 126 via the first extending sleeve portion 133 of the piston body 109 by means of a second fluid coupling 139. A second logic valve 132, coupled to the control unit 120, is arranged between the second fluid coupling 139 and the fluid supply 126. The first extending sleeve portion 133 extends from a main portion 141 of piston body 109. The main portion 141 forms at least a piston force area FA1 within the cylinder housing 103. The first extending sleeve portion 133 exhibits a smaller diameter than the main portion 141 of the piston body 109. The main portion 141 forms the piston force area FA1 within the cylinder housing 103. The piston force area FA1 exhibits an extension transverse to the axial direction X. The first engagement and disengagement device 123 is coupled to the control valve 124. The control unit 120 is adapted to control said control valve 124. Thereby is achieved that the respective piston rod can be controlled individually to make a specific motion.

In FIG. 1b is shown the fluid actuator arrangement 101 performing a motion of the first piston rod 119. The control unit, control valve and fluid supply are not shown. The first cylinder chamber 111 is pressurized with a first pressure for propelling the piston body 109 in a direction D1 along the axial direction as shown in FIG. 1c. The first hollow space 127 is pressurized with a clamping force pressure via the first fluid coupling 137 for making an engagement between the piston body and 109 and the first piston rod 119, whereby the first piston rod 119 is moved in the direction D1 as shown in FIG. 1c. In a next step shown in FIG. 1, the piston body 109 is moved in the opposite direction by pressurizing the second cylinder chamber 113. The second piston rod 121 is moved in an opposite direction D2 by pressurizing the second hollow space 128. By alternately pressurizing the first 111 and second 113 cylinder chamber in an alternately way there is achieved a first and second stroke (e.g. in an reciprocating motion) of the piston body 109. By engaging of the piston body 109 to the first piston rod 119 in the first stroke provides an individually controlled motion of the first piston rod 119. By the engaging of the piston body 109 to the second piston rod 121 in the second stroke there is provided an individually controlled motion of the second piston rod 121. It is possible to disengage the piston body 109 from the first piston rod 119 and the second piston rod 121 as shown in FIG. 1a for providing a motion of the piston body 109 disengaged from the first 119 and second 121 piston rod. Thereby is achieved that each individual piston rod in a set of at least two piston rods 119, 121, can be controlled individually. Each individual piston rod thus can be driven an optional distance independently of the stroke length of the cylinder housing, without any need of arranging a cylinder for each rod. The control unit 120 is set to control the first logic valve 130 and the second logic valve 132 (see FIG. 1a). The second logic valve 132 is coupled to the second fluid coupling 139 for fluid communication (may be defined as an activating device). The control unit 120 is coupled to the second logic valve 132 for controlling the engagement and disengagement between the piston body 109 and the second piston rod 121. Furthermore, the control unit 120 is coupled to a first sensor S1 being arranged adjacent the first piston rod 119. The control unit 120 is also coupled to a second sensor S2 being arranged adjacent the second piston rod 121. A third sensor S3 is arranged to the cylinder housing 103 and is coupled to the control unit 120. By means of actual motion/position/acceleration values detected by the first, second and third sensors S1, S2, S3 and executed by the control unit 120, control signals are generated for controlling the valve arrangement 124 and the first 130 and second 132 logic valve for desired motion performance of the respective first and second piston rod 119, 121. The first, second and third sensor S1, S2, S3 may comprise a position sensor, linear motion sensor, and/or a pressure sensor etc. The fluid actuator arrangement 101 comprises a bearing arrangement 98. The bearing arrangement 98 is arranged between the first cylinder housing 103 and the first piston body 109.

FIG. 1e illustrates a cross-section of the first piston body in a closer view. The first hollow space 127 is arranged around the first piston rod 119. A clamping (expandable) wall portion 199 is defined between the first hollow space 127 and the first piston rod 119 envelope surface.

Figure 1F:
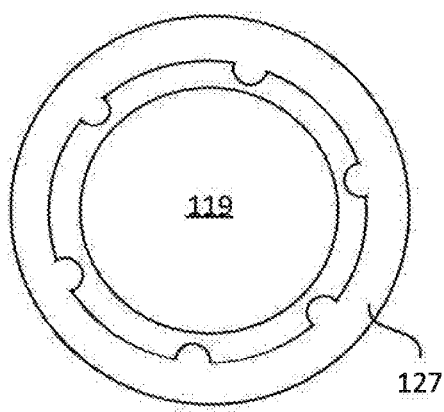
Figure 1G:
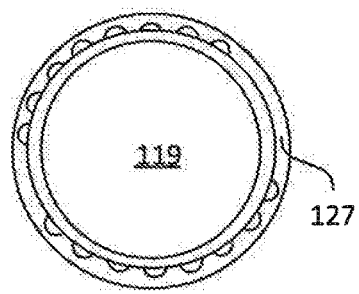

FIG. 1f illustrates a first expandable hollow space 127 according to a further embodiment adapted for clamping using a clamping surface of the piton body to a first piston rod 119. FIG. 1g illustrates a first expandable hollow space 127 according to a further embodiment adapted for clamping using a clamping surface of the piton body to a first piston rod 119.

FIG. 2 shows a second exemplary embodiment of a fluid actuator arrangement 201. The fluid actuator arrangement 201 comprises a first cylinder housing 203' including a first head member 205' and a second head member 207'. A first piston body 209' is slidable arranged in the first cylinder housing 203'. The first piston body 209' divides the first cylinder housing 203' interior into a first cylinder chamber 211' and a second cylinder chamber 213'. The first cylinder chamber 211' and the second cylinder chamber 213" are coupled to a fluid supply 226 via first fluid ports 214', 214" and a first valve arrangement 224'. The first piston body 209' exhibits a first through-bore 215' and a second through-bore 217'. Each of the through bores 215', 217' extends through the first piston body 209' parallel with an axial direction X extending along the sliding direction of the first piston body 209'. The fluid actuator arrangement 201 further comprises a second cylinder housing 203" including a first cap 205" and a second cap 207". A second piston body 209" is slidable arranged in the second cylinder housing 203". The second piston body 209" divides the second cylinder housing 203" interior into a first chamber 211" and a second chamber 213". The first chamber 211" and the second chamber 213" are coupled to the fluid supply 226 via second fluid ports 214''', 214'''' and a second valve arrangement 224". The second piston body 209" exhibits a first through-bore 215" and a second through-bore 217". Each through-bore extends through the second piston body 209″ parallel with an axial direction X extending along the sliding direction of the first piston body 209″. The first through-bore 215″ and the second through-bore 217″ both extend through the first piston body 209′ and second piston body 209″ parallel with an axial direction X′. A first piston rod 219 is arranged slidable in the first through-bore 215′. A second piston rod 221 is arranged slidable in the second through-bore 217′. The first through-bore 215′ comprises a first clamping section 216 comprising a first piston rod engagement and disengagement device 223′. The second through-bore 217′ comprises a second clamping section 218 comprising a second piston rod engagement and disengagement device 225′ for providing an individually engagement or disengagement to or from the respective first piston rod 219 and the second piston rod 221. A respective third piston rod 218 and a fourth piston rod 220 being slidable arranged in the first piston body 209′ and arranged to be individually engaged to the first piston body 209′ by a respective third 230′ and fourth 232′ piston rod engagement and disengagement device. The fluid actuator arrangement 201 comprises a first valve unit 250′ coupled to the respective first 223′, second 225′, third 230′ and fourth 232′ piston rod engagement and disengagement device of the first piston body 209′ via a first extending sleeve portion 233′ for providing fluid communication between the respective piston rod engagement and disengagement device and the first valve unit 250′ and for providing an individual engagement of the respective first 219, second 221, third 218 and fourth 220 piston rod to the first piston body 209′. The first valve unit 250′ is also coupled to a separate fluid supply (not shown) or to the fluid supply 226. A separate first fluid channel 200 is arranged between the first piston rod engagement and disengagement device 223′ and the first valve unit 250′. A separate second fluid channel is arranged between the second piston rod engagement and disengagement device 225′ and the first valve unit 250′ etc. A second valve unit 250″ is coupled to a respective first 223″, second 225″, third 230″ and fourth 232″ piston rod engagement and disengagement member of the second piston body 209″ providing fluid communication between the respective piston rod engagement and disengagement member and the second valve unit 250″ and for providing an individual engagement of the respective first 219, second 221, third 218 and fourth 220 piston rod to the second piston body 209″. The second valve unit 250″ is also coupled to a separate fluid supply (not shown) or to the fluid supply 226. A separate first fluid channel is arranged between the first piston rod engagement and disengagement device 223″ and the second valve unit 250″. A separate second fluid channel is arranged between the second piston rod engagement and disengagement device 225″ and the second valve unit 250″ etc. By means of a control unit 220 coupled to the first 224′ and second 224″ valve arrangement there is provided that the respective first 209′ and second 209″ piston body can be controlled to provide a proper motion performance, e.g. reversed reciprocating motion or other mutual motions. By means of the control unit 220 coupled to the respective first 250′ and second 250″ valve unit, each of which in turn being coupled to the respective piston rod engagement and disengagement device and the piston rod engagement and disengagement member, there is provided individually controlled engagement and disengagement of the respective first 219, second 221, third 218 and fourth 220 piston rod to the respective first 209′ and second 209″ piston body. The respective piston rod extends through the first and second piston body respectively.

Figure 3:
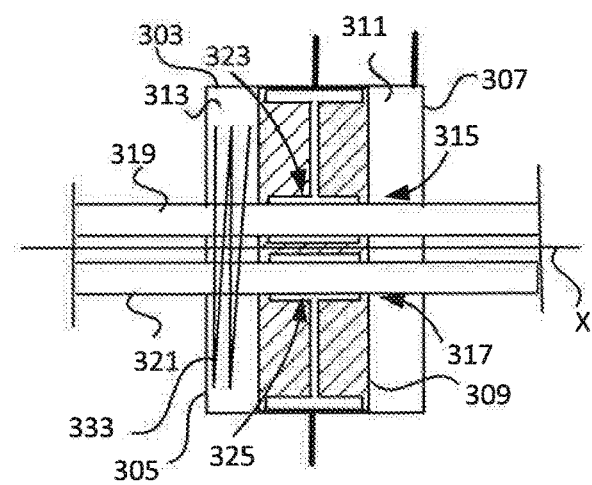
FIG. 3 illustrates a cross-sectional view of a fluid actuator arrangement according to a third example.

FIG. 3 illustrates a cross-sectional view of a fluid actuator arrangement 301 according to a third example. The fluid actuator arrangement 301 comprises a cylinder housing 303 including a first head member 305 and a second head member 307. A piston body 309 is slidable arranged in the cylinder housing 303. The piston body 309 divides the cylinder housing 303 interior into a first cylinder chamber 311 and a second cylinder chamber 313. The first cylinder chamber 311 is coupled to a fluid supply (not shown). The piston body 309 exhibits a first through-bore 315 and a second through-bore 317 that extend through the piston body 309 in an axial direction X. A first piston rod 319 is arranged slidable in the first through-bore 315 and a second piston rod 321 is arranged slidable in the second through-bore 317. The first through-bore 315 comprises a first piston rod engagement and disengagement device 323. The second through-bore 317 comprises a second piston rod engagement and disengagement device 325. The respective first piston rod engagement and disengagement device 323 and the second piston rod engagement and disengagement device 325 each is arranged in the piston body 309 for providing an individually engagement or disengagement of the piston body 309 to or from the respective first and second piston rod 319, 321. A spring member 333 is in the illustrated example arranged in the second cylinder chamber 313 for making a retraction of the piston body 309.

Figure 4A:
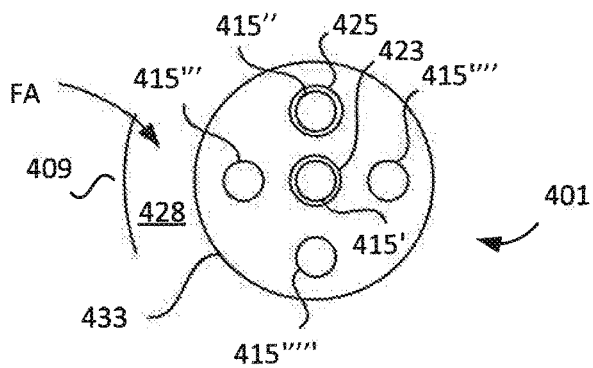
FIGS. 4a-4b each illustrates a front view of a piston body of fluid actuator arrangement according to a fourth and fifth example respectively.
Figure 4B:
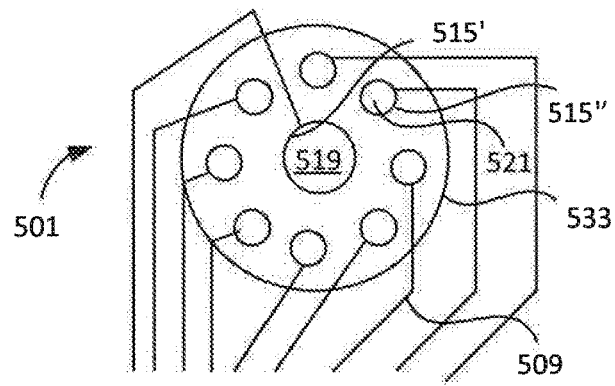

FIG. 4a illustrates a front view and cross-sectional portion of a first extending sleeve portion 433 of a piston body 409 of fluid actuator arrangement 401 according to a fourth example. Five through-bores 415′, 415″, 415‴, 415⁗, 415‴″ are arranged through the piston body 409, a wall portion of each of which comprises a separate piston rod engagement and disengagement device (423 and 425 are shown). Each piston rod engagement and disengagement device 423, 425 being coupled to a fluid supply (not shown) via control arrangement controlled by a control unit (not shown) for providing individual clamping action between the piston body 409 and a respective piston rod (not shown). The first extending sleeve portion 433 exhibits a smaller diameter than a wider body 428 of the first piston body 409 forming a piston force area FA. The piston body 409 is arranged with a prolonged engagement and disengagement device for providing individual clamping actions onto the respective envelope surface of the respective piston rod. The piston force area FA1 exhibits an extension transverse to the axial direction (see reference sign X in e.g. FIG. 1a). FIG. 4b illustrates a front view and cross-sectional portion of a first extending sleeve portion 533 of a piston body of fluid actuator arrangement 501 according to a fifth example. The piston body comprises a first through bore 515′ arranged for engagement and disengagement to a first piston rod 519. A second piston rod 521 extends through the piston body. The first piston rod 519 is of larger diameter than that of the second piston rod 521. The fluid actuator arrangement 501 comprises further third, fourth, fifth, sixth, seventh, eighth and ninth piston rods. The first piston rod 519 having larger diameter can be used for pushing a load and the second to ninth piston rod having smaller diameter can be used for pulling a load. Each through bore is provided with a respective piston rod engagement and disengagement device for individual control and propulsion of the respective piston rod. Thereby is achieved a fluid actuator arrangement that is compact and of low weight and at the same time manages to control a plurality of piston rods. Simultaneous rod movements can be performed in both directions implying high efficiency. A respective fluid line 599 is coupled to a fluid supply and the respective piston rod engagement and disengagement device.

Figure 5:
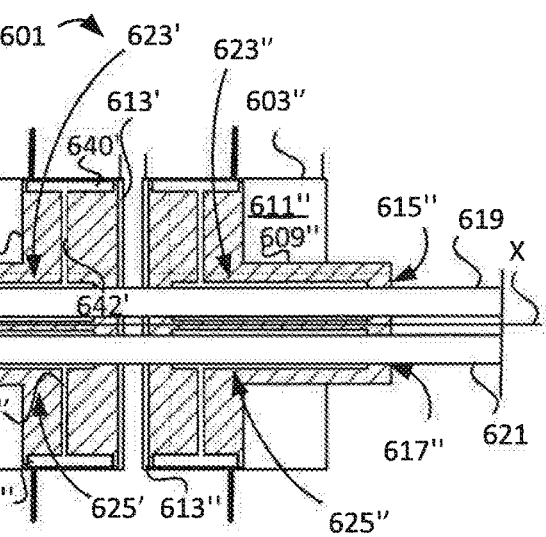
FIG. 5 illustrates a fluid actuator arrangement according to a sixth example.

FIG. 5 illustrates a fluid actuator arrangement 601 according to a sixth example. The fluid actuator arrangement 601 comprises a first cylinder housing 603'. A first piston body 609' is slidable arranged in the first cylinder housing 603'. The first piston body 609' divides the first cylinder housing 603' interior into a first cylinder chamber 611' and a second cylinder chamber 613'. The respective first 611' and second 613' cylinder chamber is coupled to a fluid supply (not shown). The first piston body 609' exhibits a first through-bore 615' and a second through-bore 617' that extend through the first piston body 609' in an axial direction X. A first piston rod 619 is arranged slidable in the first through-bore 615' and a second piston rod 621 is arranged slidable in the second through-bore 617'. The first through-bore 615' comprises a first piston rod engagement and disengagement device 623' and the second through-bore 617' comprises a second piston rod engagement and disengagement device 625', both of which are arranged for providing an individually engagement or disengagement of the first piston body 309' to or from the respective first and second piston rod 619, 621. Furthermore, the fluid actuator arrangement 601 comprises a second cylinder housing 603". A second piston body 609" is slidable arranged in the second cylinder housing 603". The second piston body 609" divides the second cylinder housing 603" interior into a first chamber 611" and a second chamber 613". The respective first 611' and second chamber 613" is coupled to the fluid supply (not shown). The second piston body 609" exhibits a first bore 615" and a second bore 617" that extend through the second piston body 609" in an axial direction X. The first piston rod 619 is also arranged slidable in the first bore 615" and the second piston rod 621 is arranged slidable in the second bore 617". The first bore 615" comprises a first engagement and disengagement device 623" and the second bore 617" comprises a second engagement and disengagement device 625", both of which are arranged for providing an individually engagement or disengagement of the second piston body 609" to or from the respective first and second piston rod 619, 621. The first piston rod engagement and disengagement device 623' comprises a first hollow space 627' coupled to the fluid supply, whereas a first flexible clamping wall of the first piston body 609' being defined between the first hollow space 627' and a first inner camping surface of the first piston body 609'. A first groove 640' of the first piston body 609' surface being arranged to, for all piston stroke positions, be coupled to the fluid supply. The first groove 640' is coupled to the first hollow space 627' via a first channel 642' arranged in the first piston body 609'.

Furthermore, the second piston rod engagement and disengagement device 625' comprises a second hollow space 627" coupled to the fluid supply, whereas a second flexible clamping wall of the first piston body 609' being defined between the second hollow space 627" and a second inner camping surface of the first piston body 609'. A second groove 640" of the first piston body 609' surface being arranged to, for all piston stroke positions, be coupled to the fluid supply. The second groove 640" is coupled to the second hollow space 627" via a second channel 642" arranged in the first piston body 609'. A similar arrangement or coupling of the respective first 623" and second 625" engagement and disengagement device to the fluid supply being provided for the second piston body 609" for providing an individual clamping action the respective first 619 and second 621 piston rod.

Figure 6:
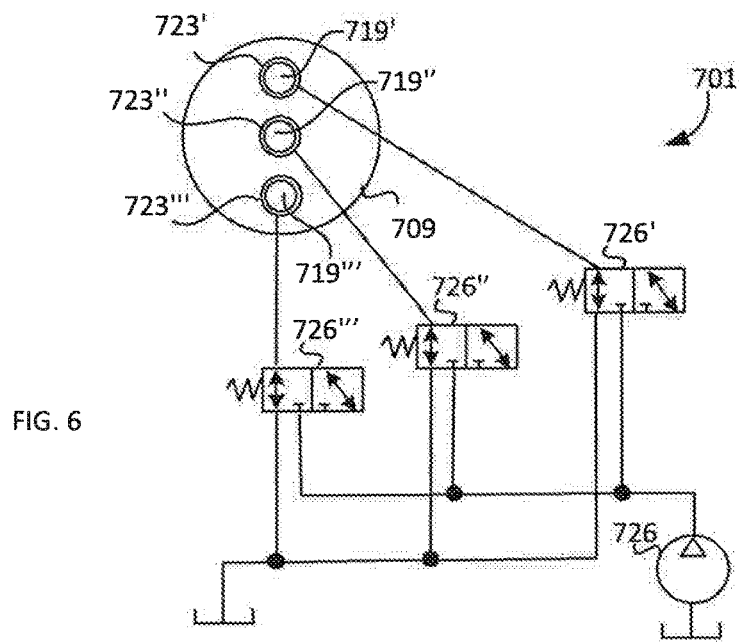
FIG. 6 illustrates a fluid actuator arrangement according to a seventh example.

FIG. 6 illustrates a fluid actuator arrangement 701 according to a seventh example. The fluid actuator arrangement 701 comprises a first 723', a second 723" and a third piston rod engagement and disengagement device 723'". Three piston rods 719', 719", 719'" are individually moved by a common piston body 709. A first logic valve 726', a second logic valve 726", a third logic valve 726'" are coupled to a control unit (not shown) for individual control of each of the logic valves 726', 726", 726". The first piston rod engagement and disengagement device 723' is coupled to a fluid supply 726 via the first logic valve 726'. The second piston rod engagement and disengagement device 723" is coupled to the fluid supply 726 via the second logic valve 726". The third piston rod engagement and disengagement device 723'" is coupled to the fluid supply 726 via the third logic valve 726".

Figure 7A:
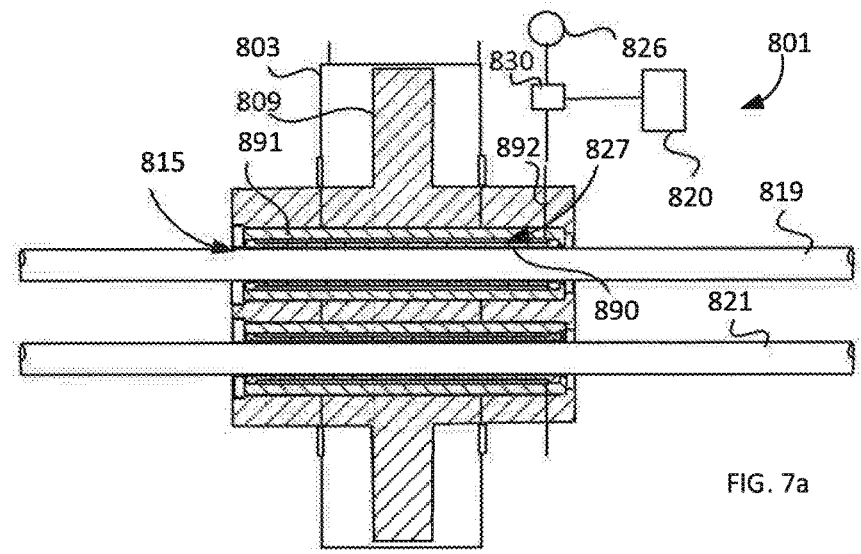
FIG. 7a illustrates a cross-sectional view of a piston body of a fluid actuator arrangement according to an eight example.
Figure 7B:
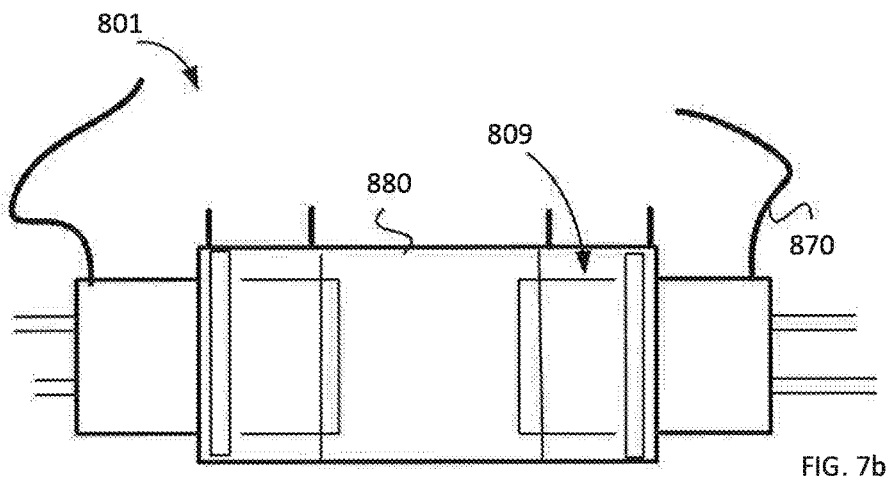

FIG. 7a illustrates a cross-sectional view of a fluid actuator arrangement 801 comprising a cylinder housing 803, a first 819 and a second piston rod 821 and a piston body 809 according to an eight example. The piston body 809 comprises an inner clamping sleeve 890. An outer surface of the inner clamping sleeve 890 and an inner surface of an outer housing 891 form a hollow space 827. The inner clamping sleeve 890 is open at its ends forming a through-bore 815. The inner clamping sleeve 890 is surrounded by the outer housing 891, which is coaxially arranged around the inner clamping sleeve 890 and encompassing said inner clamping sleeve 890 forming a clamping wall. The hollow space 827 is coupled to a channel system 892 comprising a first opening entering the hollow space 827 and a second opening entering an outer envelope surface of the piston body 809 extending from the cylinder housing 803. The channel system 892 is coupled to a fluid supply 826 via a logic valve 830 in turn being coupled to a control unit 820 adapted for controlling individual engagement and disengagement of the piston body 809 to the first piston rod 819. FIG. 7b illustrates a fluid actuator arrangement 801 comprising two piston bodies 809 of the type shown in FIG. 7a. A cylinder-shaped casing 880 forms two cylinder housings 803, within each of which the respective piston body 809 is slidable arranged. The channel system 892 shown in FIG. 7a is coupled to a fluid line arranged in a common hose 870, which encompasses other fluid lines that are coupled to the respective hollow space of the piston body 809.

Figure 8A:
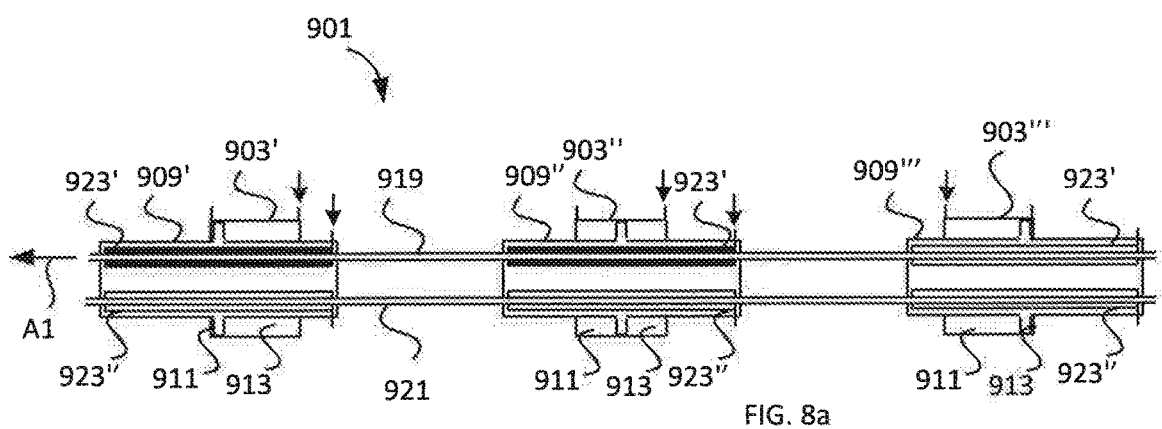
FIGS. 8a-8d illustrates a fluid actuator arrangement according to a ninth example.
Figure 8B:
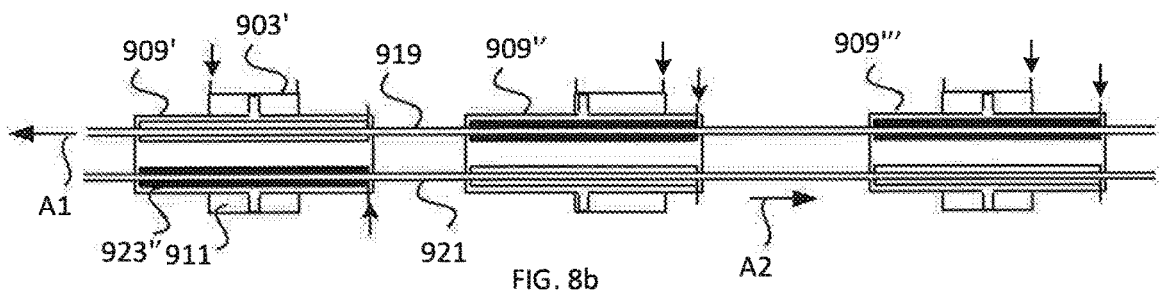
Figure 8C:
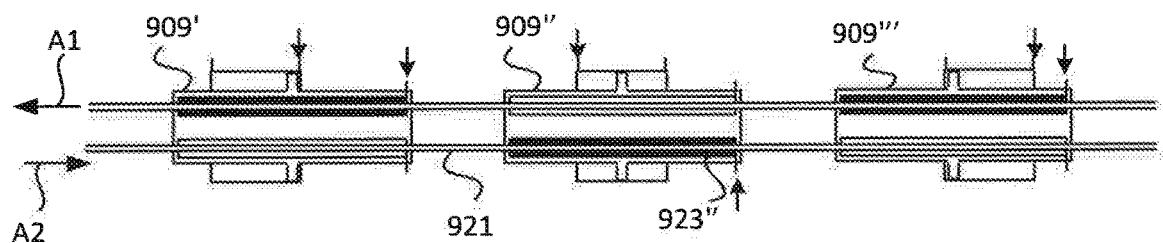
Figure 8D:
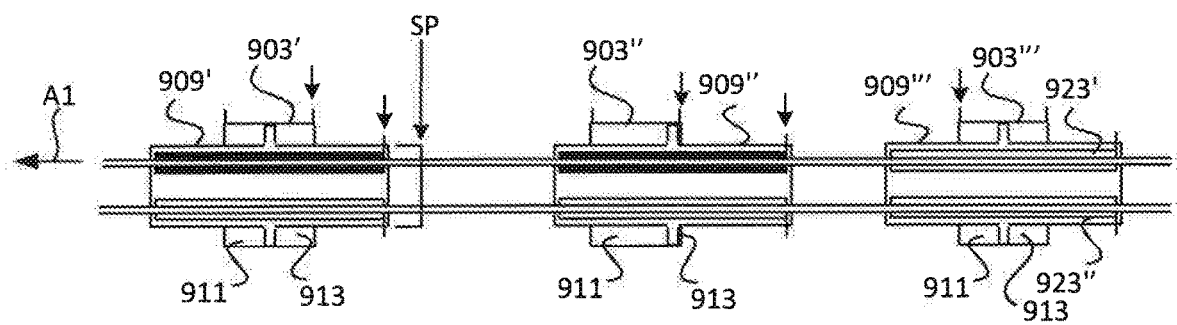

FIGS. 8a-8d illustrate a fluid actuator arrangement 901 according to a ninth example. The fluid actuator arrangement 901 comprises a first piston 909', a second piston 909" and a third piston 909'", the respective of which being arranged slidable in a respective first cylinder 903', a second cylinder 903" and a third cylinder 903'". A first and a second piston rod 919, 921 is separately and individually moved by the respective first, second and third piston 909', 909", 909'" independently from each other. The respective piston 909', 909", 909'" each divides the respective cylinder 903', 903", 903'" interior into a first cylinder chamber 911 and a second cylinder chamber 913. The respective piston 909', 909", 909'" each comprises a first and second engagement and disengagement device 923', 923", each arranged for engagement or disengagement with/from the respective first and second piston rod 919, 921. In FIG. 8a the first engagement and disengagement device 923' of the first piston 909' is activated for clamping action in engagement with the first piston rod 919, whereas the second cylinder chamber 913 of the first cylinder 903' is pressurized for moving the first piston 909' together with the first piston rod 919 in the direction of first arrow A1. Also the first engagement and disengagement device 923' of the second piston 909" is activated for clamping action in engagement with the first piston rod 919 whereas the second cylinder chamber 913 of the second cylinder 903" is pressurized for moving the second piston 909" together with the first piston rod 919 in the direction of arrow A1. The first cylinder chamber 911 of the third cylinder 903''' is pressurized for retraction of the third piston 909''', wherein the first engagement and disengagement device 923' of the third piston 909''' is not actuated (i.e. disengaged from the first piston rod 919). In FIG. 8b is shown that the first cylinder chamber 911 of the first cylinder 903' is pressurized for retraction stroke, wherein the first engagement and disengagement device 923' of the first piston 909' is not actuated. The retraction stroke is also regarded as a working stroke as the second engagement and disengagement device 923" of the first piston 909' is activated for engagement of the first piston 909' to the second piston rod 921 for moving the second piston rod 921 in a direction according to second arrow A2. The third piston 909''' is engaged with the first piston rod 919 for providing a smooth motion of the first piston rod in the direction of first arrow A1 as the engagement of the second piston 909" to the first piston rod 919 presently will come to an end and the retraction of the second piston 909" will take place as shown in FIG. 8c. In FIG. 8c also being shown that the second engagement and disengagement device 923" of the second piston 909" is activated for further motion of the second piston rod 921 in the direction of second arrow A2. At the same time the first piston rod 919 is further moved in the direction of first arrow A1 by the activation of the respective first 923' and third 923''' engagement and disengagement device of the first and third piston 909', 909''' respectively. In FIG. 8d is shown that the first cylinder chamber 911 of the third cylinder 903''' is pressurized for retraction of the third piston 909'''. Neither of the first 923' nor the second 923" engagement and disengagement device of the third piston 909''' being activated for clamping action whereby the second piston rod 921 is controlled to not be moved. In FIG. 8d is also shown that the second cylinder chamber 913 of the first cylinder 903' and the second cylinder chamber 913 of the second cylinder 903" being pressurized for moving the respective first 909' and second 909" piston in the direction of first arrow A1. The motion of the third piston 909''' shown in FIG. 8c overlaps the motion of the first piston 909' shown in FIG. 8d and provides a third reciprocating motion of the third piston 909''', whereas the third reciprocating motion overlaps a first stroke starting point SP1 of the first piston body 909'. The alternately pressurizing of the first 911 and second 913 cylinder chamber of the first, second and third cylinder 903', 903", 903''' implies that an arrangement has been provided that can control continuous movement of the respective first 919 and second 921 piston rod and desired individual motion directions of the first 919 and second 921 piston rod respectively. Thereby is also achieved a non-pulsated motion of the respective piston rod. Thereby is achieved that an individual piston rod, of a set of at least two piston rods, can be controlled individually and can be driven an optional distance independently of the stroke length of the cylinder housing, without any need of arranging a cylinder housing for each piston rod.

Figure 9:
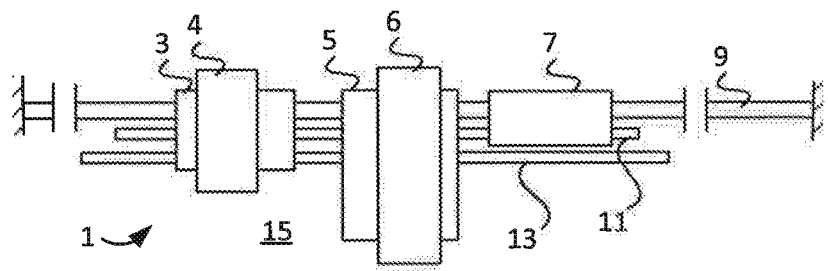
FIG. 9 illustrates a fluid actuator arrangement according to a tenth example.

FIG. 9 illustrates a fluid actuator arrangement 1 according to a tenth example. The fluid actuator arrangement 1 comprises a first piston 3 within a first cylinder 4, a second piston 5 within a second cylinder 6 and a static holding unit 7. A first fixed main rod 9 is fixed to a global coordinate system. A second 11 and a third 13 rod are arranged locally movable relative the first fixed main rod 9. The fluid actuator arrangement 1 is arranged in a jig 15.

Figure 10B:
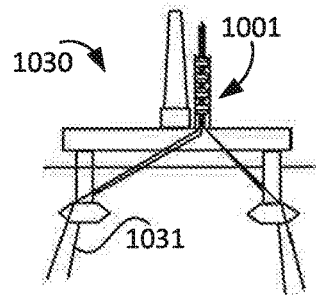
FIGS. 10a-10d illustrates a fluid actuator arrangement according to an eleventh example and put into use in optional applications.
Figure 10C:
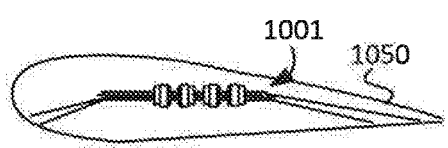
Figure 10D:
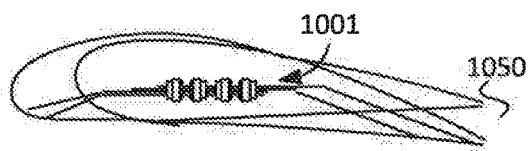
Figure 10A:
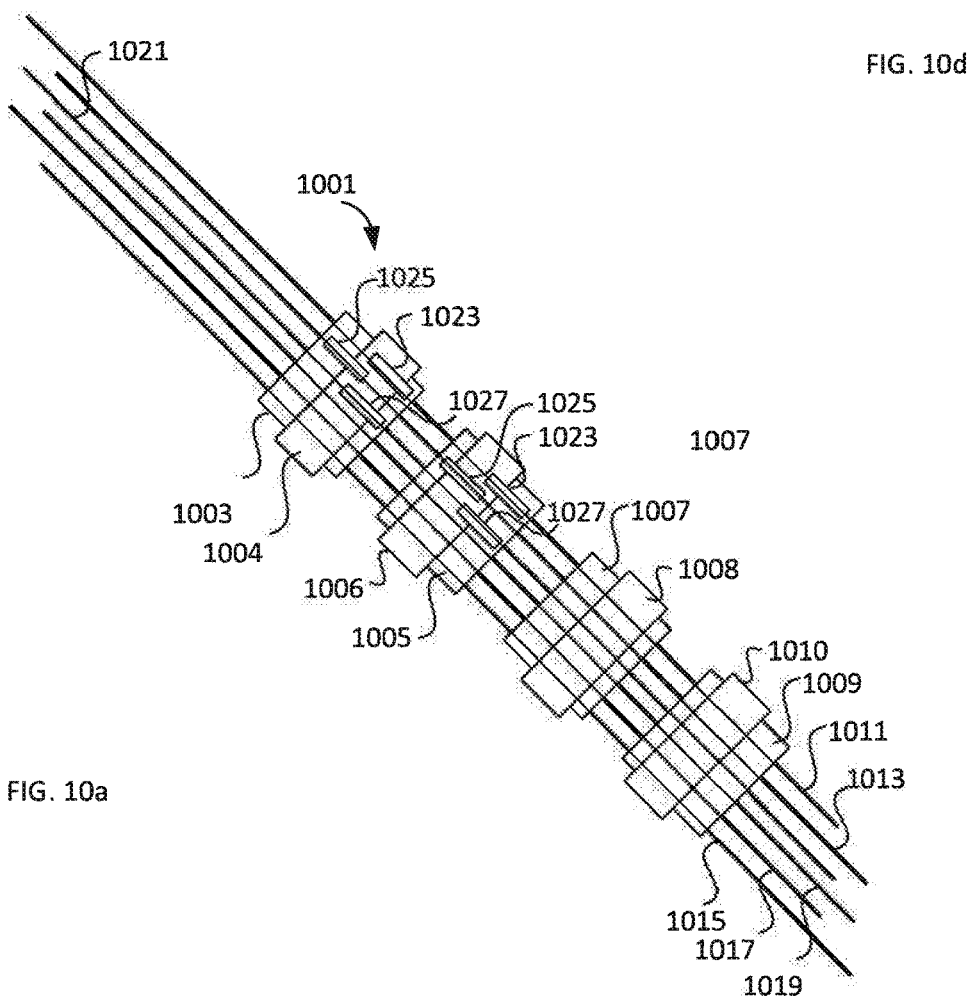

FIG. 10a shows a fluid actuator arrangement 1001 according to an eleventh exemplary embodiment. The fluid actuator arrangement 1001 comprises a first 1003, a second 1005, a third 1007 and a fourth 1009 piston, each of which being arranged in respective a first 1004, a second 1006, a third 1008 and a fourth 1010 cylinder. Individual controllable first 1011, second 1013, third 1015, fourth 1017, fifth 1019 and sixth 1021 piston rods, each of which being arranged individually slidable and able to be engaged by the respective first 1003, second 1005, third 1007 and fourth 1009 piston by means of determined and controlled activation (controlled by a not shown control unit) of a first 1023, a second 1025, third 1027, fourth, fifth and sixth engagement and disengagement device (partially marked and shown) arranged in the respective first, second, third and fourth piston. FIG. 10b illustrates an offshore platform 1030. The fluid actuator arrangement 1001 may be applied to the offshore platform 1030 and is used as a motion compensator for decreasing undesirable effects of the relative motion between the offshore platform and the seabed. The fluid actuator arrangement 1001 is coupled to anchor cable 1031 and works as a dampener for dampening changes in forces and stresses due to the undulating motion of the waves. By means of the fluid actuator arrangement 1001 there is achieved that the multiple piston rods can be used in co-operation with the common pistons and at least two full time opposite working pistons can be used. By separate pressurization of each engagement and disengagement device there is achieved instantaneous clamping by instantaneous (e.g. logic) valve arrangement switching. By means of the fluid actuator arrangement 1001 is achieved simultaneous piston rod movements in both directions. FIGS. 10c and 10d illustrate the fluid actuator arrangement 1001 arranged in a morphing wing 1050 (shown in cross-section). The morphing wing 1050 is arranged to a high performance aircraft that can change its external shape to adapt it to changing mission environment during flight to optimize the lift and drag parameters for reducing fuel consumption.

Figure 11A:
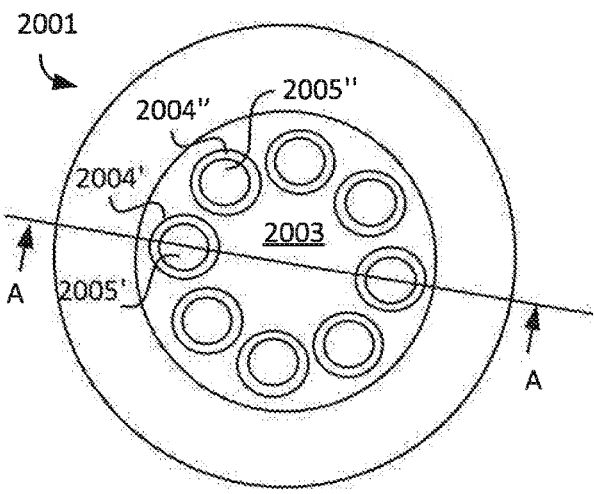
FIGS. 11a-11b illustrate a piston of a fluid actuator arrangement according to a twelfth example.
Figure 11B:
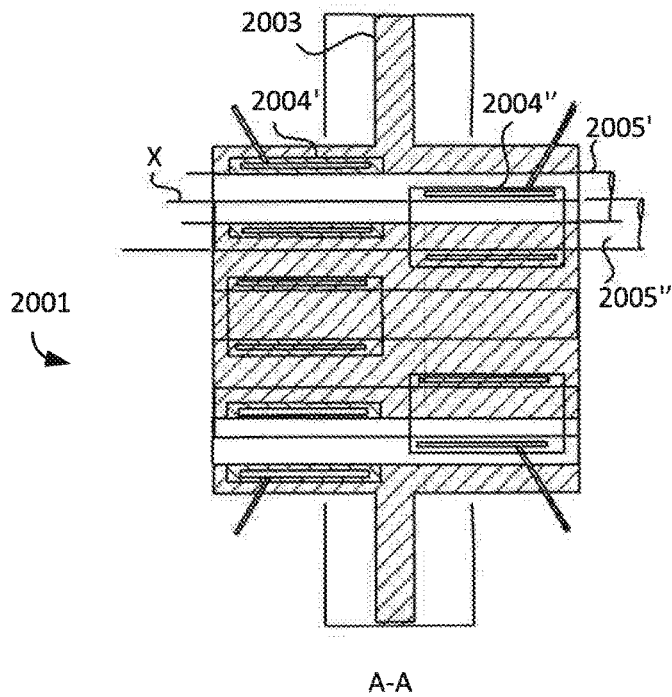

FIGS. 11a-11b illustrates a piston 2003 of a fluid actuator arrangement 2001 according to a twelfth example. FIG. 11a shows the piston 2003 in a front view. The piston 2003 comprises eight engagement and disengagement devices 2004'-2004" etc. (only two are marked with reference signs) and eight piston rods 2005', 2005" etc. (only two are marked with reference signs), each of which is arranged able to be individually controlled for being engaged to the common piston 2003 by means of its respective engagement and disengagement device. FIG. 11b illustrates the piston 2003 in a cross-section A-A marked in FIG. 11a. A first engagement and disengagement device 2004' exhibits a length along the axial direction X that is of such measure that an adjacent second engagement and disengagement device 2004" is able to be positioned displaced in the axial direction X with overlap relative the first engagement and disengagement device 2004' involving that pressurizing of the first engagement and disengagement device 2004' will not affect the second engagement and disengagement device 2004" and thus will not affect a second piston rod 2005" associated with the second engagement and disengagement device 2004". This means that the common piston 2003 can be made space saving and consequently the fluid actuator arrangement 2001 per se can be made less bulky. Preferably, the length of the first engagement and disengagement device 2004' corresponds with the length of the second engagement and disengagement device 2004" and exhibits a measure that is less than half the length overall of the common piston 2003 in the axial direction.

Figure 12A:
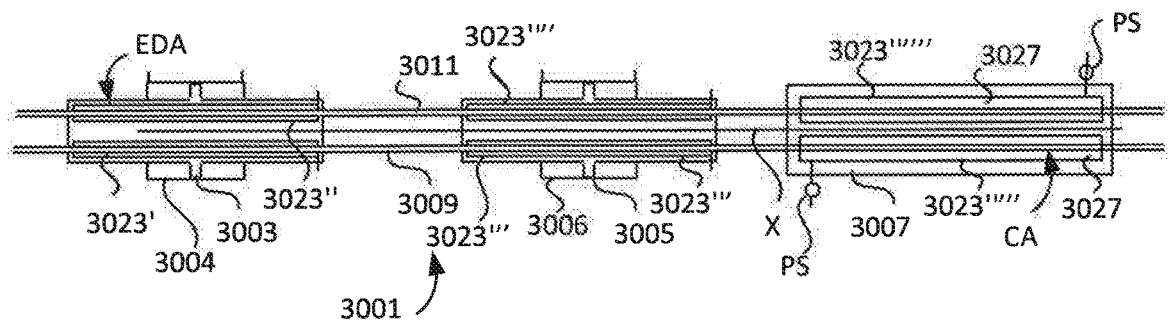
FIGS. 12a and 12b illustrate further fluid actuator arrangements according to a thirteenth and fourteenth example respectively.
Figure 12B:
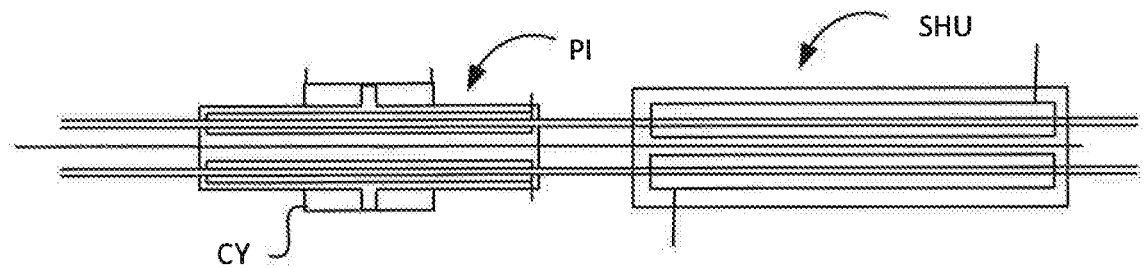

FIG. 12a illustrates a fluid actuator arrangement 3001 according to a thirteenth example. The fluid actuator arrangement 3001 comprises a first piston 3003 within a first cylinder 3004, a second piston 3005 within a second cylinder 3006 and a static holding unit 3007. A first rod 3009 is arranged along the axial direction X and through a first engagement and disengagement device 3023' of the first piston 3003. A second rod 3011 is arranged along the axial direction X and through a second engagement and disengagement device 3023" of the first piston 3003. The first rod 3009 is arranged through a third engagement and disengagement device 3023''' of the second piston 3005. The second rod 3011 is arranged through a fourth engagement and disengagement device 3023'''' of the second piston 3005. The static holding unit 3007 comprises a fifth engagement and disengagement device 3023''''', through which the first rod 3009 extends in the axial direction X. The static holding unit 3007 further comprises a sixth engagement and disengagement device 3023'''''', through which the second rod 3011 extends in the axial direction X. A clamping surface area CA of the static clamping unit 3007 for each individual rod 3009, 3011 exhibits an extension, seen in the axial direction X, that is longer than the length of the extension of an engagement and disengagement area EDA (defined as the respective piston rod engagement area or clamping surface of the respective piston that can be activated for performing a clamping action around each individual rod) engagement and disengagement device of the first piston 3003 (or second piston), seen in the axial direction X. Thereby is achieved at least two full time opposite working pistons. By the separate pressurization of each engagement and disengagement device (clamping element), there is achieved fast clamping and by straight forward valve switching, there are provided simultaneous rod movements in both directions. Optionally, there may be arranged a respective pressure sensor PS to a hollow space 3027, each of which is arranged in the respective engagement and disengagement device 3023', 3023", 3023''', 3023'''', 3023''''', 3023''''''. Each pressure sensor PS is in turn coupled to a control unit (not shown). FIG. 12b illustrates a fluid actuator arrangement according to a fourteenth example. This embodiment is similar to that shown in FIG. 12b, but revealing the difference that the fluid actuator arrangement just comprises one single piston PI within a first cylinder CY. The first rod is arranged along the axial direction and through a first engagement and disengagement device the piston PI. The second rod is arranged along the axial direction and through a second engagement and disengagement device of the piston PI. A static holding unit SHU comprises a third engagement and disengagement device through which the first rod extends in the axial direction. The static holding unit SHU further comprises a fourth engagement and disengagement device through which the second rod extends in the axial direction.

Figure 13:
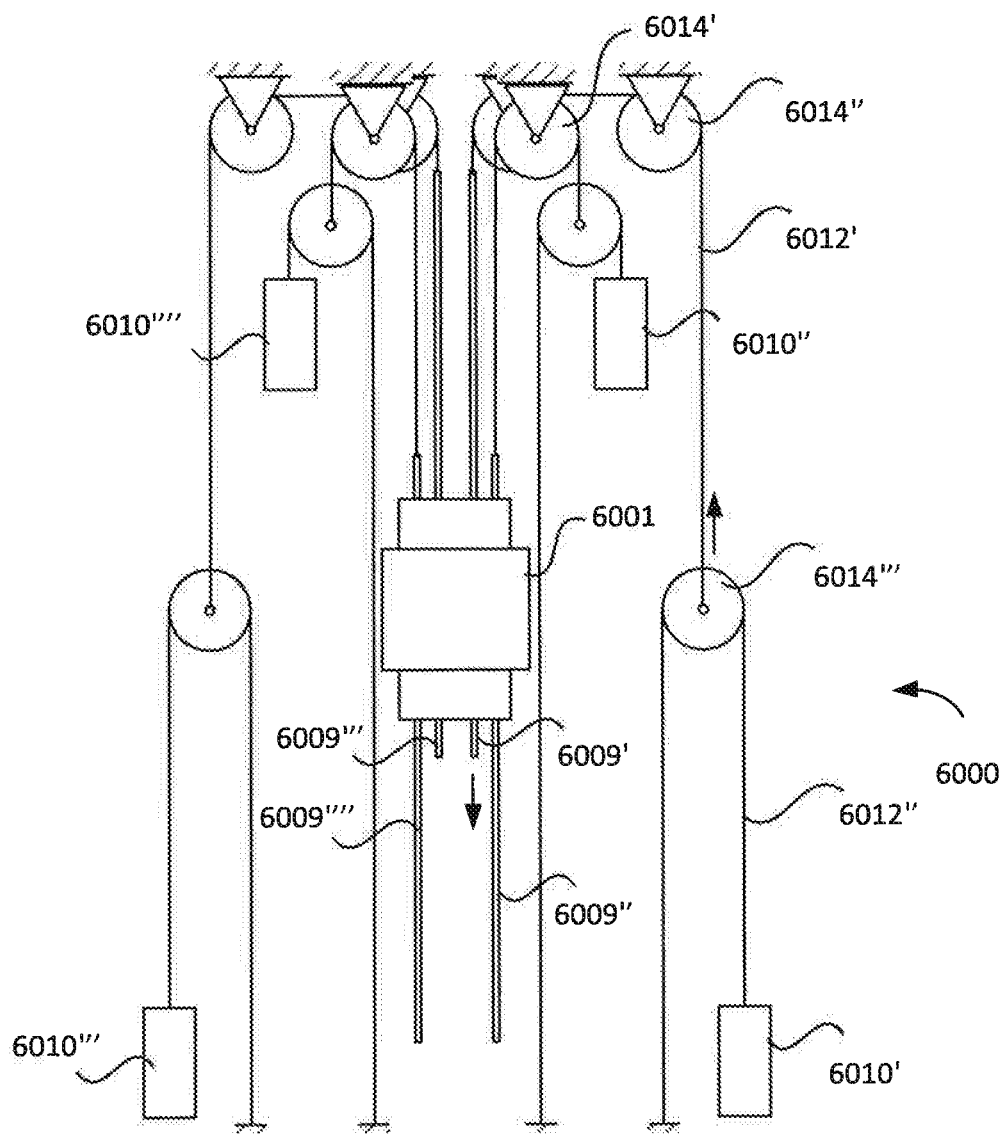
FIG. 13 illustrates a fluid actuator arrangement of a further application.

FIG. 13 illustrates a fluid actuator arrangement 6001 of a multi elevator apparatus 6000. Four piston rods 6009', 6009", 6009''', 6009'''' (first, second, third, fourth), each of which is coupled to a respective elevator wire, are used by the fluid actuator arrangement 6001 for lifting a respective load 6010', 6010", 6010''', 6010''''. The first piston rod 6009' is coupled at its upper end to a first elevator wire 6012'. The first elevator wire 6012' is guided by a first and second pulley wheel 6014', 6014" to a third lower pulley wheel 6014'''', which guides a further wire 6012" and is arranged as a gear pulley. In such way is achieved a power efficient system since the pressure level can optimized against the actual total load. By means of the multiple rods in a common piston there is achieved an extremely compact and lightweight design. The fluid actuator arrangement 6001 may also be used to re-generate power when the elevator goes down.

Figure 14B:
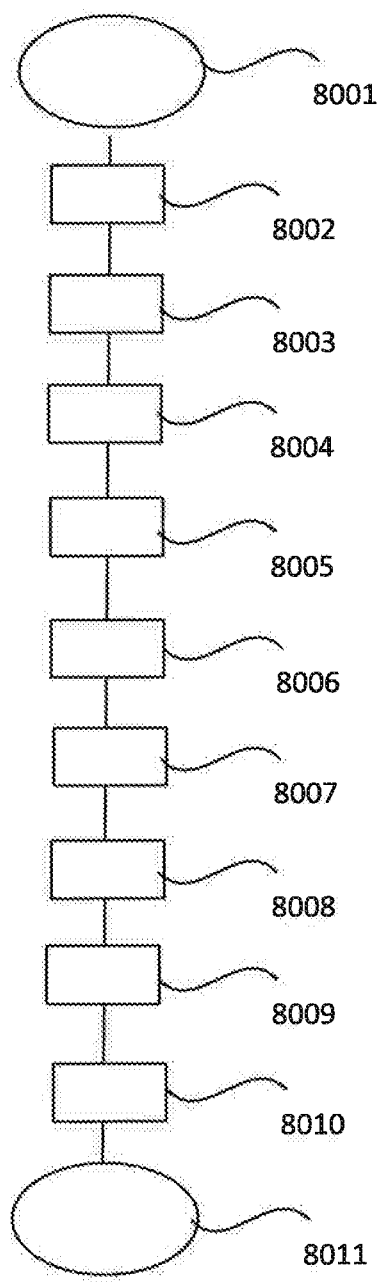
FIGS. 14a and 14b illustrate flowcharts showing exemplary methods according to different aspects of a fluid actuator arrangement.
Figure 14A:
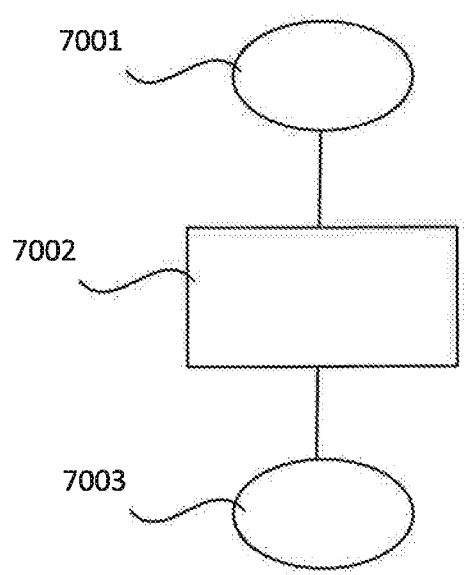

FIGS. 14a and 14b illustrate flowcharts showing exemplary methods according to different aspects of a fluid actuator arrangement. FIG. 14a illustrates a flow chart of an exemplary method for controlling the motion of a first piston rod and a second piston rod by means of a first piston body slidable arranged in a first cylinder housing of a fluid actuator arrangement, the first piston body divides the first cylinder housing interior into a first cylinder chamber and a second cylinder chamber, the first piston body exhibits a first through-bore and a second through-bore encompassing the first piston rod and the second piston rod, the first piston body comprises a first and second engagement and disengagement device arranged for engagement with the respective first and second piston rod. The method starts in a Step 7001. In Step 7002 is provided pressurizing the first and second cylinder chamber providing alternately a first and second stroke for achieving an reciprocating motion of the first piston body; engaging the first piston body to the first piston rod in the first stroke; engaging the first piston body to the second piston rod in the second stroke; and disengaging the first piston body from the first piston rod and the second piston rod. In step 7003 the method stops.

FIG. 14b illustrates a flow chart of a further exemplary method of a fluid actuator arrangement further comprising a second piston body slidable arranged in a second cylinder housing and dividing the second cylinder housing interior into a first cylinder chamber and a second cylinder chamber, the second piston body exhibits a first through-bore and a second through-bore encompassing the first piston rod and the second piston rod, the second piston body comprises a first and second engagement and disengagement device arranged for engagement with the respective first and second piston rod. The method starts in a Step 8001. In Step 8002 is provided pressurizing the first and second cylinder chamber providing alternately a first and second stroke for achieving a reciprocating motion of the first piston body. In Step 8003 is provided engaging the first piston body to the first piston rod in the first stroke. In Step 8004 is provided engaging the first piston body to the second piston rod in the second stroke. In Step 8005 is provided disengaging the first piston body from the first piston rod and the second piston rod. In Step 8006 is provided pressurizing the first and second cylinder chamber of the first cylinder housing providing alternately a first and second stroke for achieving a first reciprocating motion of the first piston body. In Step 8007 is provided pressurizing the first and second cylinder chamber of the second cylinder housing providing alternately a first and second stroke for achieving a second reciprocating motion of the second piston body, the first reciprocating motion being reversed relative the second reciprocating motion. In Step 8008 is provided engaging the first piston body to the first piston rod in the first stroke and disengaging the second piston body from the first piston rod. In Step 8009 is provided engaging the second piston body to the second piston rod in the first stroke of and disengaging the first piston body from the second piston rod. In Step 8009 is provided engaging the first piston body to the second piston rod in the second stroke and disengaging the first piston body from the first piston rod. In Step 8010 is provided engaging the second piston body to the first piston rod in the second stroke and disengaging the second piston body from the second piston rod. In Step 8011 the method is stopped. One option is to provide a second pressure to all cylinder chambers of the fluid actuator arrangement to disengage all the piston rod engagement and disengagement devices from the common piston rod.

Figure 15:
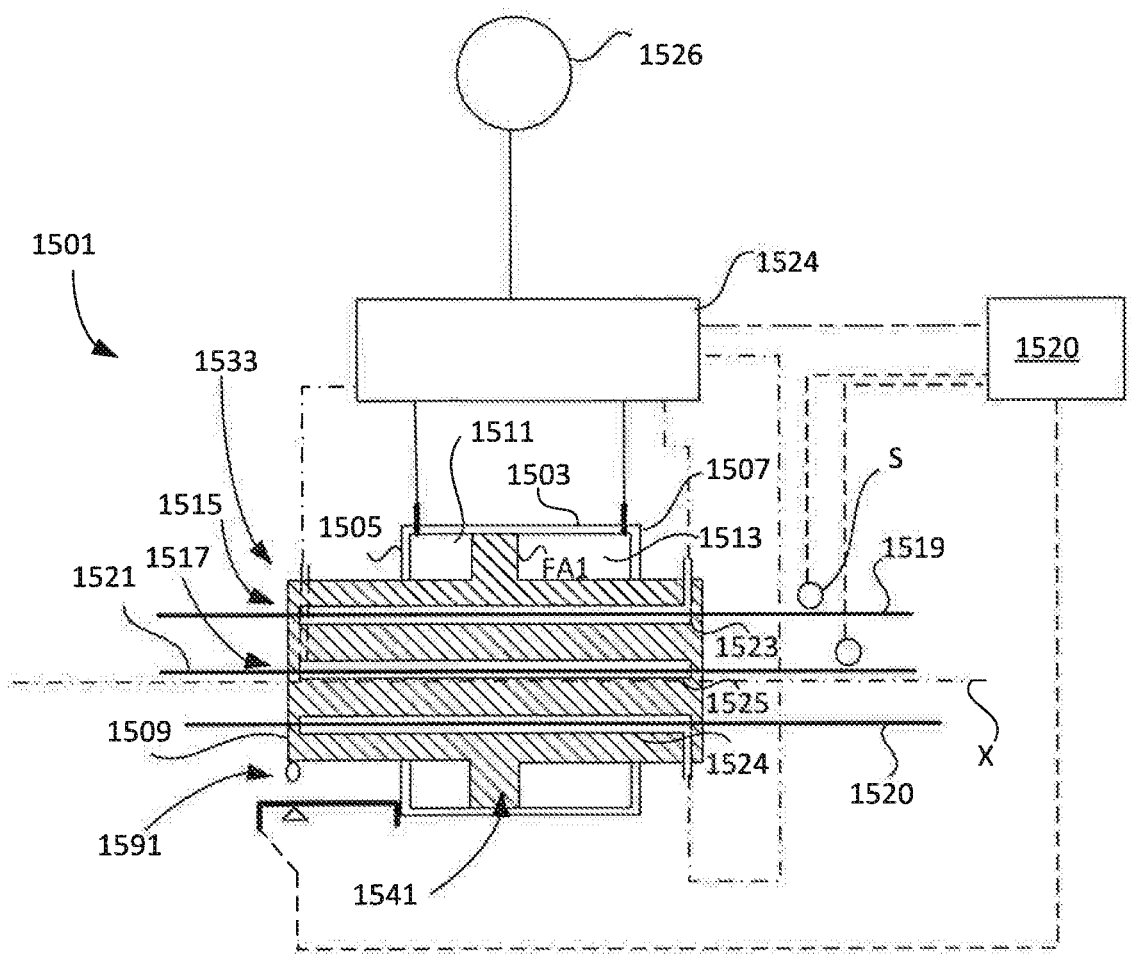
FIG. 15 illustrates a fluid actuator arrangement according to a further example.

FIG. 15 illustrates a fluid actuator arrangement 1501 according to a further example. The fluid actuator arrangement 1501 shown in FIG. 15 comprises a cylinder 1503 including a first cylinder head end 1505 and a second cylinder head end 1507. A piston 1509 is slidable arranged in the cylinder 1503. The piston 1509 is divides the cylinder's 1503 interior into a first cylinder chamber 1511 and a second cylinder chamber 1513. The first and second cylinder chamber 1511, 1513 are coupled to a fluid supply 1526 via a valve arrangement 1524. The piston 1509 exhibits a first through-bore 1515 and a second through-bore 1517 that each extends through the piston 1509 in an axial direction X. A first piston rod 1519 is arranged slidable in the first through-bore 1515 and a second piston rod 1521 is arranged slidable in the second through-bore 1517. The first through-bore 1515 comprises a first engagement and disengagement device (clamping member) 1523 and the second through-bore 1517 comprises a second engagement and disengagement device 1525 (clamping member). The respective clamping member are arranged for providing individual engagement or disengagement to or from the respective first 1519 and second 1521 piston rod. The fluid actuator arrangement 1501 comprises the valve arrangement 1524 coupled to the first and second engagement and disengagement device 1523, 1525 and to the fluid supply 1526. The piston 1509 comprises a first and second extending sleeve portion 1533 that each extends in the axial direction X from the cylinder 1503 interior through the respective cylinder head end 1505, 1507. The first and second extending sleeve portion 1533 each exhibits a smaller diameter than a first body 1541 of the piston 1509 forming a piston force area FA1 (extending transverse to the axial direction X) within the cylinder 1503. The respective first engagement and disengagement device 1523, 1525 each being coupled to the valve arrangement 1524 and a control unit 1520 is adapted to control the valve arrangement 1524. The valve arrangement 1524 is provided to be controlled for operation of the motion of the piston 1509 by pressurization of the respective first and second cylinder chamber 1511, 1513. The valve arrangement 1524 is furthermore provided for controlling the engagement of the piston 1509 to the respective first, second, and a third piston rod, 1519, 1521, 1520 by pressurization of the respective first, second, and a third engagement and disengagement device 1523, 1525, 1524.

Alternately, a sensor member 1591 is associated with the piston rods for measuring the motion pattern and position of the first, second, third piston rod 1519, 1521, 1520 in such way that the sensor member 1591 measures the position of the piston 1509 relative the cylinder 1503 and feeds the piston position data to the control unit 1520, which control unit 1520 also registers the history of engagements of the piston 1509 to the respective first, second, third piston rods 1519, 1521, 1520, wherein each engagement is related to and taken into account for each measured data regarding the motion of the piston 1509.

Preferably, the sensor member comprises a linear position sensor and/or a linear contacting potentiometer and/or a linear variable differential transformer (LVDT) and/or a magnetostrictive sensor and/or a displacement transducer and/or a magnetostrictive potentiometer and/or an absolute linear encoder and/or incremental linear encoder and/or a linear displacement sensor and/or a contactless In-cylinder linear transducer and/or another linear potentiometer.

The fluid actuator arrangement 1501 comprises a sensor device S coupled to the control unit 1520 adapted to control the motion of the first piston rod 1519 according to a feedback loop and adapted to compare a desired position value with an actual position value of the position of first piston rod 1519 relative the cylinder 1503.

Figure 16A:
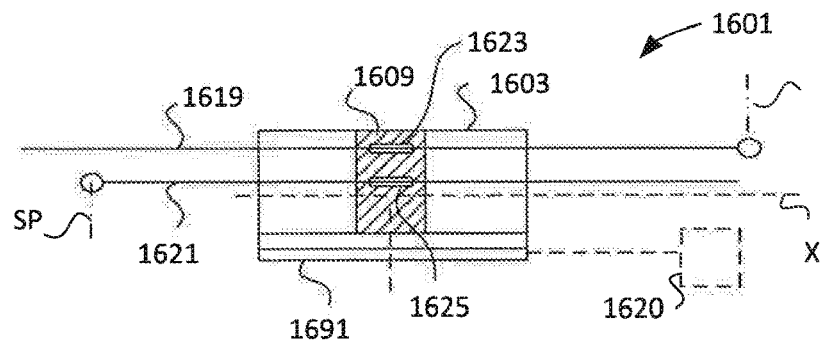
FIGS. 16a to 16d illustrate a fluid actuator arrangement according to yet another example.
Figure 16B:
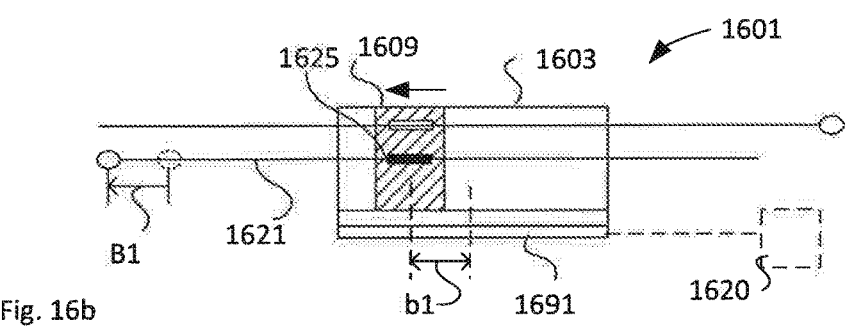
Figure 16C:
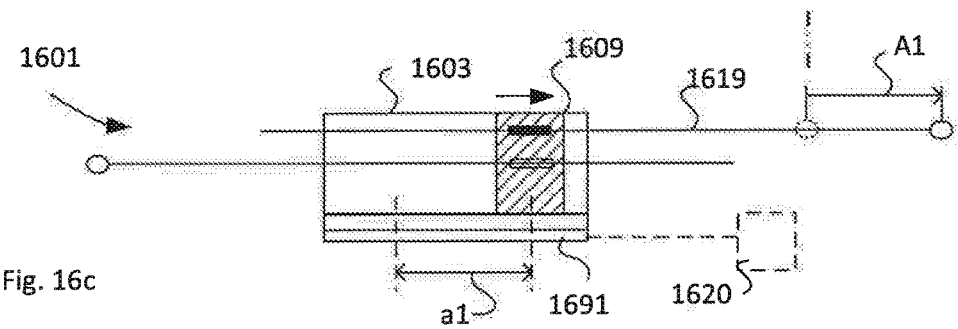
Figure 16D:
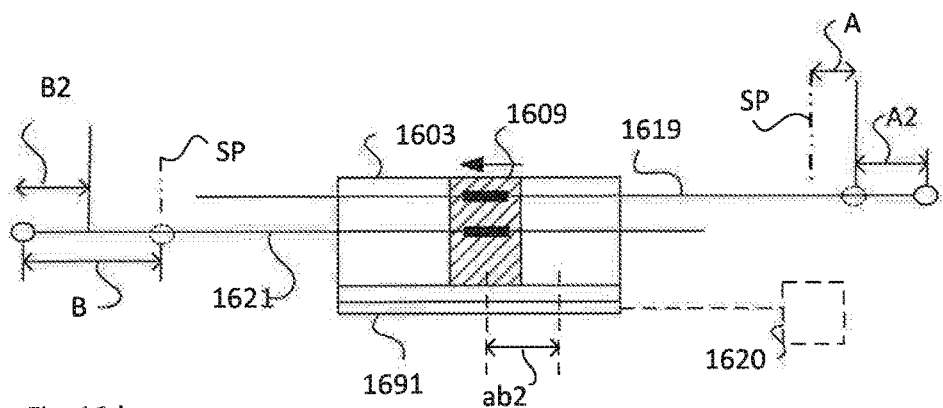

Suitably, the magnetostrictive sensor uses a sensing magnet (not shown), a wave guide a pick up coil, electronics to measure the position of the piston 1509, wherein the magnet is attached to the piston 1509. A wire of the wave guide is attached to the stationary part of the cylinder 1503. FIGS. 16a to 16d illustrate a fluid actuator arrangement according to yet another example. FIG. 16a shows a fluid actuator arrangement 1601 according to a further example. The fluid actuator arrangement 1601 comprises a cylinder 1603. A piston 1609 is slidable arranged in the cylinder 1603. A first and second piston rod 1619, 1621 is arranged slidable through the piston 1609 in an axial direction X. The piston 1609 comprises a first and second engagement and disengagement device 1623, 1625. The respective first and second engagement and disengagement device being arranged for providing individual engagement or disengagement to or from the respective first 1619 and second 1621 piston rod. A sensor member 1691 is associated with the first and second piston rods 1619, 1621 for measuring the position of the first and second piston rods 1619, 1621. This is performed by that the sensor member 1691 measures the position of the piston 1609 relative the cylinder 1603 and feeds a piston motion data to a control unit 1620. The control unit 1620 in turn registers the history of engagements of the piston 1609 to the respective first and second piston rod 1619, 1621. Each engagement is thus related to and taken into account for each measured data regarding the new position of the piston 1609 by means of the control unit 1620. FIG. 16b shows that the second engagement and disengagement device 1625 is controlled to engage the piston 1609 with the second piston rod 1621. The motion b1 is registered by the sensor member 1691, which feeds a measured data value regarding the position of the piston 1609 to the control unit 1620. The control unit 1620 may store this measured data value in a second memory unit (not shown) corresponding with the actual distance B1 performed by the second piston rod 1621. In FIG. 16c is shown that a position a1 is measured by the sensor member 1691. The value of the position of the piston is stored by the control unit 1620 wherein the actual distance A1 performed by the first piston rod 1619 is registred. In FIG. 16d is shown the position of the piston 1609 moved a stroke length marked ab2. The first piston rod 1619 is moved the distance A2. The distance ab2 made by the piston is registred by the control unit 1620, which executes a calculation of the actual distance A of the first piston rod 1619 relative the starting position SP: A=A1−A2 (ab2). The value of the stroke length ab2 also is used for calculating the actual distance the second piston rod 1621 has been moved from its starting point SP: B=B1+B2 (ab2). Preferably, the value of every new position of the piston relative the cylinder housing being measured by the sensor member is stored in a memory unit of the control unit and by means of the control unit. Suitably, the value of every new position is related to a reference value. Preferably, the reference value is a well-defined and known position of the piston relative the cylinder housing. Suitably, the well-defined and known position corresponds with a position of the piston rod relative the cylinder housing wherein the piston rod is moved to an end position relative the cylinder housing.

FIGS. 17a to 17d schematically illustrate a fluid actuator arrangement 1701 according to another example.

Figure 17A:
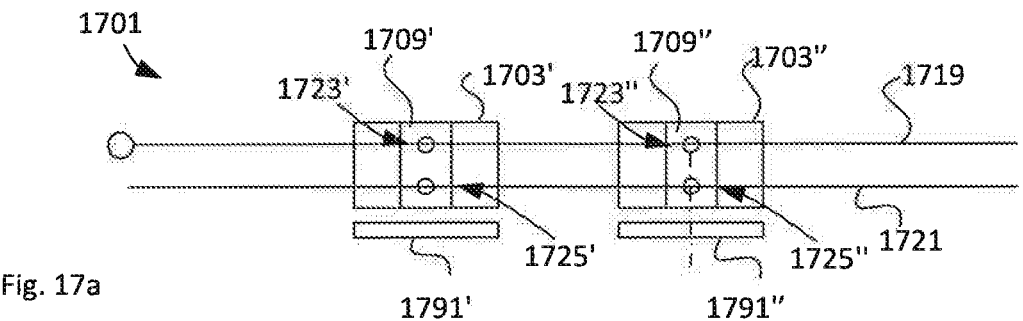
FIGS. 17a to 17d illustrate a fluid actuator arrangement according to another example.

Preferably, the fluid actuator arrangement in the FIGS. 17a to 17 comprises a plurality of piston rods and/or comprises a three or more cylinders having a respective piston comprising such engagement and disengagement devices dedicated to a specific piston rod as described herein.

Figure 17B:
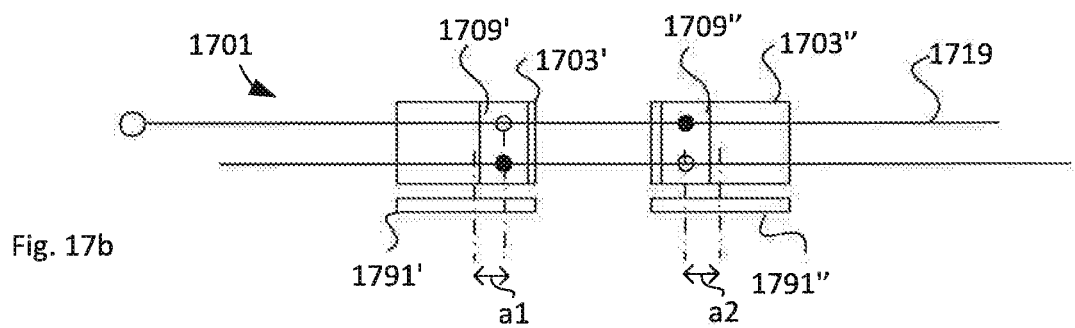
Figure 17C:
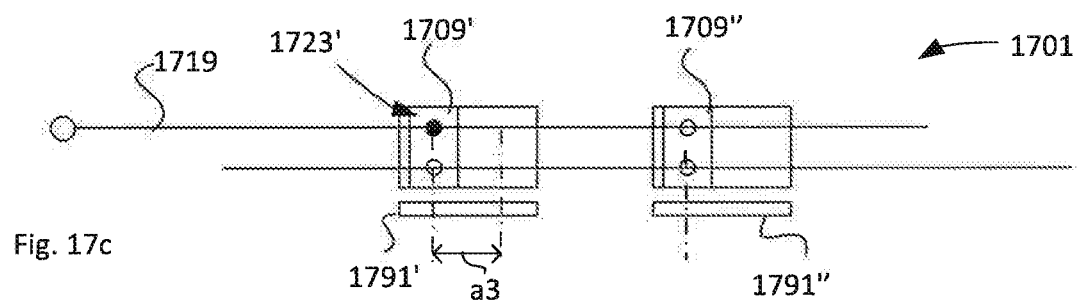
Figure 17D:
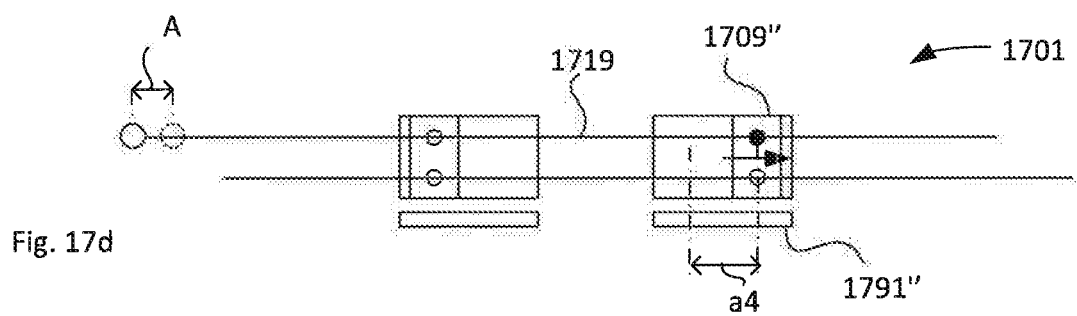

FIG. 17a shows a fluid actuator arrangement 1701 comprising a first and second cylinder 1703', 1703". A first piston 1709' is slidable arranged in the first cylinder 1703'. A second piston 1709" is slidable arranged in the second cylinder 1703". A first and second piston rod 1719, 1721 is arranged slidable through the respective first and second piston 1709', 1709" in an axial direction X. The first piston 1709' in a similar way comprises a first and second engagement and disengagement device 1723', 1725'. The second piston 1709" comprises a first and second engagement and disengagement device 1723", 1725". A first and second sensor member 1791', 1791" being associated with the first and second piston rods 1719, 1721 for measuring the pattern and position of the first and second piston rods 1719, 1721. This is performed by that the first sensor member 1791' measures the position of the first piston 1709' relative the first cylinder 1703' and feeds a piston position data to a control unit (not shown). The control unit registers the history of engagements of the first piston 1709' to the respective first and second piston rod 1719, 1721. The second sensor member 1791" measures the position of the second piston 1709" relative the second cylinder 1703" and feeds a piston position data to the control unit. The control unit registers the history of engagements of the second piston 1709" to the respective first and second piston rod 1719, 1721. Each engagement is thus related to and taken into account for each measured data regarding the position of the first and second piston 1709', 1709" by means of the control unit. FIG. 17b illustrates that the second engagement and disengagement device 1725' of the first piston 1709' is operated to engage the second piston rod 1721 and the first engagement and disengagement device 1723" of the second piston 1709" is operated to engage the first piston rod 1719 for moving the piston rods the respective distance a1 and a2. FIG. 17c shows that the first piston 1709' has been moved the distance a3, meantime the first engagement and disengagement device 1723' of the first piston 1709' is activated by the control unit for engagement of the first piston 1709' to the first piston rod 1719. The first sensor member 1791' detects this position and the control unit registers that the first piston rod 1719 has been moved (by engaging the first engagement and disengagement device 1723' of the first piston 1709' to the first piston rod 1719) a distance a3. FIG. 17d shows that the second piston clamps and moves the first piston rod 1719 back wherein in a distance a4 is registered by the control unit by means of the second sensor member 1791". The control unit will calculate the actual position of the first piston rod 1719 relative the starting point in FIG. 17a by using the stored (in a memory unit of the control unit) measured values a2, a3, a4: A=+a2+a3−a4.

Figures 18, 19:
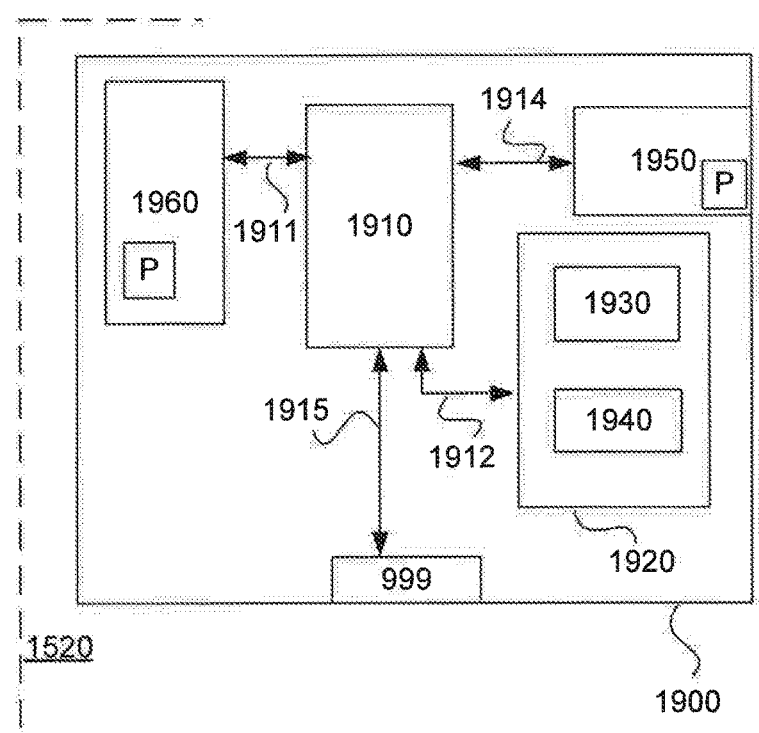
FIG. 18 shows a table illustrating an example of determination of the actual piston rod position.
FIG. 19 illustrates a CPU device according to an example of the invention.

FIG. 18 shows a table illustrating a principle how a control unit of the fluid actuator arrangement according to an optional embodiment will execute the determination of the actual position of a first, second, third, fourth piston rod a, b, c, d (not shown). P1 indicates a first piston feature of a first piston (not shown). P2 indicates a second piston feature of a second piston (not shown). A respective first, second, third, fourth engagement and disengagement device a1, b1, c1, d1 of the first piston being provided for engagement with the respective first, second, third, fourth piston rod. A respective first, second, third, fourth engagement and disengagement device a2, b2, c2, d2 of the second piston being provided for engagement with the respective first, second, third, fourth piston rod. A first sensor member S1-P1 of the first piston feature is provided to measure the actual distance that the first piston makes relative a first cylinder (not shown). A second sensor member S2-P2 of the second piston feature is provided to measure the actual distance that the second piston makes relative a first cylinder (not shown).

In the first line of the table regarding the operation of the piston rods, i.e. below S1-P1/S2-P2 there is shown that the distance (measured by the first sensor member S1-P1) that the first piston has made is zero (null) from a starting point and that the distance that the second piston has made is −12 mm (from a starting point). As the second engagement and disengagement device b2 of the second piston is engaged to the second piston rod, the second piston rod will be moved a distance of −12 mm. The distance of −12 mm made by the second piston at the same time as the engagement of the second engagement and disengagement device b2 to the second piston rod will imply that the second piston rod is moved −12 mm from the starting point. In a next step the first piston will be moved +7 mm and the second piston will be moved +10 mm. The second engagement and disengagement device b1 of the first piston is controlled to be engaged to the second piston rod. The control unit has stored that the second piston has been moved −12 mm. The engagement of the first piston to the second piston rod will imply a registered distance of +7 mm. The control unit calculates an actual value of position of the second piston rod by adding registred +7 mm to previous registred −12 mm (the actual value of made distance from the starting point of the second piston rod will be −5 also being registred by the control unit). The third engagement and disengagement device c2 of the second piston is controlled to be engaged to the third piston rod wherein the third piston rod will be moved +10 mm from the starting point. In a next step the second engagement and disengagement device b1 is kept in engagement with the second piston rod and the fourth engagement and disengagement device d1 of the first piston is engaged with the fourth piston rod. The first piston will be moved −15 mm and the second piston will be moved +12 mm to new position. The second piston rod will be moved −15 mm and the fourth piston rod will be moved −15 mm. Those values will also be registred by the control unit. The control unit calculates actual values of made distance (the position from starting point), i.e. for the second piston rod: −5−15=−20 and for the fourth piston rod: 0−5=−15. The calculation of the actual position CPFS from the starting point is shown in right column in FIG. 18.

FIG. 19 illustrates a CPU device 1900 according to one aspect of the invention. The CPU device 1900 may be used in a control unit (e.g. reference 1520, 1620) of a fluid actuator arrangement. The control unit is configured to control the linear motion of the piston rods. The control unit thus comprises the CPU device 1900 of a computer. The CPU device 1900 comprises a non-volatile memory NVM 1920, which is a computer memory that can retain stored information even when the computer is not powered. The CPU device 1900 further comprises a processing unit 1910 and a read/write memory 1950. The NVM 1920 comprises a first memory unit 1930. A computer program (which can be of any type suitable for any operational data) is stored in the first memory unit 1930 for controlling the functionality of the CPU device 1900. Furthermore, the CPU device 1900 comprises a bus controller (not shown), a serial communication left (not shown) providing a physical interface, through which information transfers separately in two directions. The CPU device 1900 may comprise any suitable type of I/O module (not shown) providing input/output signal transfer, an A/D converter (not shown) for converting continuously varying signals from detectors (not shown) of the fluid actuator arrangement and from other monitoring units (not shown) for detecting the positions of the piston rod and the common (first and/or second) piston body, into binary code suitable for the computer. Other operational data may be actual loads, piston rod velocity etc.

The CPU device 1900 also comprises an input/output unit (not shown) for adaptation to time and date. The CPU device 1900 comprises an event counter (not shown) for counting the number of event multiples that occur from independent events in operation of the fluid actuator arrangement. Furthermore, the CPU device 1900 includes interrupt units (not shown) associated with the computer for providing a multi-tasking performance and real time computing for automatically adapting the speed of the first, second, third piston rods and other features in accordance with programmed data.

The NVM 1920 also includes a second memory unit 1940 for external controlled operation. A data medium storing program P may comprise routines for automatically adapting the speed of the common piston body in accordance with the actual fluid pressure and is provided for operating the CPU device 1900 for performing the method.

The data medium storing program P comprises a program code stored on a medium, which is readable on the computer, for causing the control unit to perform the method for controlling the motion of the piston rods.

The data medium storing program P further may be stored in a separate memory 1960 and/or in the read/write memory 1950. The data medium storing program P, in this embodiment, is stored in executable or compressed data format.

It is to be understood that when the processing unit 1910 is described to execute a specific function that involves that the processing unit 1910 may execute a certain part of the program stored in the separate memory 1960 or a certain part of the program stored in the read/write memory 1950.

The processing unit 1910 is associated with a data port 999 for communication via a first data bus 1915. The non-volatile memory NVM 1920 is adapted for communication with the processing unit 1910 via a second data bus 1912. The separate memory 1960 is adapted for communication with the processing unit 1910 via a third data bus 1911. The read/write memory 1950 is adapted to communicate with the processing unit 1910 via a fourth data bus 1914. The data port 999 is preferably connectable to data links of a robot apparatus. When data is received by the data port 999, the data will be stored temporary in the second memory unit 1940. After that the received data is temporary stored, the processing unit 1910 will be ready to execute the program code, according to the above-mentioned method.

Preferably, the signals (received by the data port 999) comprise information about operational status of the fluid actuator arrangement, such as operational status regarding the position of the respective first and second piston body relative each other and relative the cylinder housing and/or the actual position of the first and second piston rods and/or stored data of previous positions of the first and second piston rods.

The signals may also comprise information about e.g. operational data regarding fluid pressure data and/or load data and/or fluid temperature, etc.

According to one aspect, signals received by the data port 999 may contain information about actual positions of piston rods and of the first base member by means of sensor members. The received signals at the data port 999 can be used by the CPU device 1900 for controlling and monitoring of the automatically adaptation of the speed and/or motion and/or position of the piston body in accordance with a predetermined value.

The signals received by the data port 999 can be used for automatically moving the piston body between two end positions. The signals can be used for different operations of the fluid actuator arrangement, such as operating the pressurization of each individual clamping element and/or clamping member and/or clamping unit. The information is preferably measured by means of suitable sensor members of the fluid actuator arrangement. The information can also be manually fed to the control unit via a suitable communication device, such as a computer display or a touchscreen. The method can also partially be executed by the CPU device 1900 by means of the processing unit 1910, which processing unit 1910 runs the data medium storing program P being stored in the separate memory 1960 or the read/write memory 1950. When the CPU device 1900 runs the data medium storing program P, suitable method steps disclosed herein will be executed. A data medium storing program product comprising a program code stored on a medium is also provided, which product is readable on the computer, for providing a method for controlling the motion of a first piston rod 119 and a second piston rod 121 by means of a first piston body 109, 209' slidable arranged in a first cylinder housing 103, 203' of a fluid actuator arrangement 101, 201, the first piston body 109, 209' divides the first cylinder housing 103, 203' interior into a first cylinder chamber 111, 211' and a second cylinder chamber 113, 213', the first piston body 109, 209' exhibits a first through-bore 115, 215' and a second through-bore 117, 217' each encompassing the first piston rod 119, 219 and the second piston rod 121, 221 respectively, the first piston body 109, 209' comprises a first 123, 223' and second engagement and disengagement device 125, 225' arranged for engagement with the respective first 119, 219 and second piston rod 121, 221, wherein the method comprises the steps of: pressurizing the first and second cylinder chamber 113, 213' providing alternately a first and second stroke for achieving a reciprocating motion of the first piston body 109, 209'; engaging the first piston body 109, 209' to the first piston rod 119, 219 in the first stroke; and engaging the first piston body 109, 209' to the second piston rod 121, 221 in the second stroke, when a data medium storing program P according to claim 22 is run on the control unit.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims.

One aspect may involve that the fluid actuator arrangement is adapted for momentary disengaging all piston rods from the piston body or piston bodies for propelling the mass of the individual piston rod using the kinetic energy of the mass (in a way reminding of a freewheel clutch). One aspect may involve that a static clamping unit may clamp (engage) around a specific individual piston rod.

One aspect may involve that the piston rod engagement and disengagement area ($A_{eng}$) of each engagement and disengagement device of a first piston body coupled to the respective piston rod is at least ten times larger the effective piston force area ($A_{pis}$) according to the following formula, wherein "$P_{sys}$" is the system pressure, "$P_{clamp}$" is the clamping pressure of said engagement and disengagement device and "fc" is the friction coefficient having the value 10 or larger.

$$P_{sys}*A_{pis} < \text{fc}*P_{clamp}*A_{eng}$$

One aspect may involve that the clamping surface of the static clamping unit, seen in the axial direction, may have an extension that is longer than the length of the extension of an engagement and disengagement area of a piston body, seen in the axial direction.

The fluid may be gas or hydraulic oil.

The invention claimed is:

1. A fluid actuator arrangement comprising;
   a first cylinder housing including a first head member and a second head member;
   a first piston body is slidable arranged in said first cylinder housing;
   the first piston body divides the first cylinder housing interior into a first cylinder chamber and a second cylinder chamber, at least the first cylinder chamber being coupled to a fluid supply;
   characterized by that;
   the first piston body exhibits a first through-bore and a second through-bore that extend through the first piston body in an axial direction;
   a first piston rod is arranged slidable in the first through-bore and a second piston rod is arranged slidable in the second through-bore; and
   the first through-bore comprises a first engagement and disengagement device and the second through-bore comprises a second engagement and disengagement device, which are arranged for providing individual engagement or disengagement to or from the respective first and second piston rod, wherein the first and the second engagement and disengagement devices are arranged in the first piston body and provide independent and alternate clamping action on the first piston rod and the second piston rod, respectively.

2. The fluid actuator arrangement according to claim 1, wherein the fluid actuator arrangement comprises a valve arrangement coupled to the first and second engagement and disengagement device and to a fluid supply.

3. The fluid actuator arrangement according to claim 1, wherein the first engagement and disengagement device comprises a first hollow space coupled to the fluid supply, whereas a first flexible clamping wall of the first piston body being defined between the first hollow space and a first inner camping surface of said first piston body.

4. The fluid actuator arrangement according to claim 1, wherein the first piston body comprises a first extending sleeve portion that extends in the axial direction from a first cylinder housing interior through at least the first head member.

5. The fluid actuator arrangement according to claim 4, wherein the first extending sleeve portion exhibits a smaller diameter than a first body of the first piston body forming a piston force area within the first cylinder housing.

6. The fluid actuator arrangement according to claim 1, wherein the first engagement and disengagement device is coupled to a control valve, wherein a control unit is adapted to control said control valve.

7. The fluid actuator arrangement according to claim 1, wherein the first cylinder chamber and the second cylinder chamber each being coupled to the fluid supply via a valve member for controlling a reciprocating motion of the first piston body.

8. The fluid actuator arrangement according to claim 1, wherein the fluid supply is coupled to the first engagement and disengagement device via a first fluid channel of a first extending sleeve portion of the first piston body extending from the first cylinder housing in the axial direction.

9. The fluid actuator arrangement according to claim 1, wherein the number of piston rods extending through the first piston body being three or more.

10. The fluid actuator arrangement according to claim 1, wherein the first piston rod being of larger diameter than the second piston rod.

11. The fluid actuator arrangement according claim 1, wherein a first sensor member is associated with the first piston rod.

12. The fluid actuator arrangement according to claim 1, wherein a fixed main rod is fixed to a global coordinate system, the fixed main rod constitutes the first piston rod and at least one second piston rod is locally movable relative the main rod.

13. The fluid actuator arrangement according to claim 1, wherein the fluid actuator arrangement further comprises; a second cylinder housing including a first head member and a second head member; a second piston body slidable arranged in said second cylinder housing; the second piston body divides the second cylinder housing interior into a first cylinder chamber and a second cylinder chamber, at least the first cylinder chamber is coupled to the fluid supply: the second piston body exhibits a first through-bore and a second through-bore that extend through the second piston body in the axial direction; the first piston rod is arranged slidable in the first through-bore and the second piston rod is arranged slidable in the second through-bore; and the first through-bore comprises a first engagement and disengagement device and the second through-bore comprises a second engagement and disengagement device for providing an individually engagement or disengagement of the second piston body to or from respective piston rod.

14. The fluid actuator arrangement according to claim 1, wherein a bearing member is arranged between the first cylinder housing and the first piston body.

15. A method for controlling the motion of a first piston rod and a second piston rod by means of a first piston body slidably arranged in a first cylinder housing of a fluid actuator arrangement, wherein the first piston body divides the first cylinder housing interior into a first cylinder chamber and a second cylinder chamber, the first piston body exhibits a first through-bore-and a second through-bore each encompassing the first piston rod and the second piston rod respectively, and the first piston body comprises a first and second engagement and disengagement device arranged for engagement with the respective first and second piston rod wherein the first and second engagement and disengagement devices are arranged in the first piston body and provide independent and alternate clamping action on the first piston rod and the second piston rod, respectively; the method comprises the steps of:
   pressurizing the first and second cylinder chamber providing alternately a first and second stroke for achieving a reciprocating motion of the first piston body;
   engaging the first piston body to the first piston rod in the first stroke; and
   engaging the first piston body to the second piston rod in the second stroke.

16. The method according to claim 15, wherein the fluid actuator arrangement further comprises a second piston body slidable arranged in a second cylinder housing and dividing the second cylinder housing interior into a first cylinder chamber and a second cylinder chamber, the second piston body exhibits a first through-bore and a second through-bore encompassing the first piston rod and the second piston rod, the second piston body comprises a first and second engagement and disengagement device arranged for engagement with the respective first and second piston rod; the method comprises the steps of:

pressurizing the first and second cylinder chamber of the first cylinder housing providing alternately the first and second stroke for achieving the first reciprocating motion of the first piston body;

pressurizing the first and second cylinder chamber of the second cylinder housing providing alternately the first and second stroke for achieving a second reciprocating motion of the second piston body, the first reciprocating motion being reversed relative the second reciprocating motion;

engaging the first piston body to the first piston rod in the first stroke of the first reciprocating motion and disengaging the second piston body from the first piston rod;

engaging the second piston body to the second piston rod in the first stroke of the second reciprocating motion and disengaging the first piston body from the second piston rod;

engaging the first piston body to the second piston rod in the second stroke and disengaging the first piston body from the first piston rod.

17. The method according to claim 15, wherein the fluid actuator arrangement further comprises a first static clamping unit activated for clamping on the first piston rod by pressurizing an interior expandable cavity of the first static clamping unit by means of a fluid supply or other fluid supply, the method comprises the step of:

engaging the first static clamping unit to the first piston rod, whereby at least the first piston body is disengaged from the first and second piston rod.

18. The method according to claim 15, wherein the fluid actuator arrangement further comprises a third piston body slidable arranged in a third cylinder housing and dividing the third cylinder housing interior into a first cylinder chamber and a second cylinder chamber, the third piston body exhibits a first through-bore and a second through-bore encompassing the first piston rod and the second piston rod, the third piston body comprises a first and second engagement and disengagement device arranged for engagement with the respective first and second piston rod; the method comprises the steps of:

alternately pressurizing the first and second cylinder chamber of the third cylinder housing providing alternately a first and second stroke for achieving a third reciprocating motion of the third piston body, the first stroke of the third reciprocating motion overlaps the first stroke of the third reciprocating motion starting point of the first piston body is disengaged from the first and second piston rod.

19. The method according to claim 15, wherein the method further comprises the step of disengaging the first piston body from the first piston rod and the second piston rod.

20. A fluid actuator arrangement comprising;
a first cylinder housing including a first head member and a second head member;
a first piston body is slidable arranged in said first cylinder housing;
the first piston body divides the first cylinder housing interior into a first cylinder chamber and a second cylinder chamber, at least the first cylinder chamber being coupled to a fluid supply;
characterized by that;
the first piston body exhibits a first through-bore and a second through-bore that extend through the first piston body in an axial direction;
a first piston rod is arranged slidable in the first through-bore and a second piston rod is arranged slidable in the second through-bore; and
the first through-bore comprises a first engagement and disengagement device and the second through-bore comprises a second engagement and disengagement device, which are arranged for providing individual engagement or disengagement to or from the respective first and second piston rod and comprising a sensor member that is associated with the first piston rod for measuring a position of the first piston rod in such way that the sensor member measures the position of the first piston body relative the first cylinder housing.

21. The fluid actuator arrangement according to claim 20, wherein the fluid actuator arrangement comprises a sensor device coupled to a control unit adapted to control the motion of the first piston rod according to a feedback loop and adapted to compare a desired position value with an actual position value of the position of first piston rod relative the first cylinder housing.

22. A data medium storing program adapted for controlling the motion of a first piston rod and a second piston rod by means of a first piston body slidable arranged in a first cylinder housing of a fluid actuator arrangement, the first piston body divides the first cylinder housing interior into a first cylinder chamber and a second cylinder chamber, the first piston body exhibits a first through-bore and a second through-bore each encompassing the first piston rod and the second piston rod respectively, the first piston body comprises a first and second engagement and disengagement device arranged for engagement with the respective first and second piston rod, wherein said data medium storing program comprises a program code stored on a medium, which is readable on a computer, for causing a control unit to perform the method steps of:

pressurizing the first and second cylinder chamber providing alternately a first and second stroke for achieving a reciprocating motion of the first piston body;
engaging the first piston body to the first piston rod in the first stroke; and
engaging the first piston body to the second piston rod in the second stroke.

23. The data medium storing program according to claim 22 further comprising a program code for:
pressurizing the first and second cylinder chamber providing alternately a first and second stroke for achieving a reciprocating motion of the first piston body;
engaging the first piston body to the first piston rod in the first stroke; and
engaging the first piston body to the second piston rod in the second stroke.

* * * * *